United States Patent
Aastuen et al.

(10) Patent No.: US 6,786,604 B2
(45) Date of Patent: *Sep. 7, 2004

(54) PROJECTION SYSTEM HAVING LOW ASTIGMATISM

(75) Inventors: David J. W. Aastuen, Farmington, MN (US); Charles L. Bruzzone, Woodbury, MN (US); Jiaying Ma, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 10/159,694

(22) Filed: May 29, 2002

(65) Prior Publication Data

US 2003/0048423 A1 Mar. 13, 2003

Related U.S. Application Data

(63) Continuation-in-part of application No. 09/878,559, filed on Jun. 11, 2001.

(51) Int. Cl.[7] .................. G03B 21/14; G03B 21/00; G03B 21/28
(52) U.S. Cl. .................. 353/20; 353/31; 353/81
(58) Field of Search .................. 353/20, 31, 33, 353/69, 81, 84

(56) References Cited

U.S. PATENT DOCUMENTS

| 4,943,155 | A | * | 7/1990 | Cross, Jr. .................. 353/33 |
|---|---|---|---|---|
| 5,808,798 | A | | 9/1998 | Weber et al. |
| 5,882,774 | A | | 3/1999 | Jonza et al. |
| 5,946,054 | A | | 8/1999 | Sannohe et al. |
| 5,962,114 | A | | 10/1999 | Jonza et al. |
| 5,965,247 | A | | 10/1999 | Jonza et al. |
| 6,062,694 | A | | 5/2000 | Oikawa et al. |
| 6,179,424 | B1 | * | 1/2001 | Sawamura .................. 353/33 |
| 6,188,529 | B1 | | 2/2001 | Koyama et al. |
| 6,238,051 | B1 | * | 5/2001 | Huang .................. 353/81 |
| 6,250,763 | B1 | * | 6/2001 | Fielding et al. .................. 353/31 |
| 6,362,922 | B2 | | 3/2002 | Tadic-Galeb et al. |
| 6,364,489 | B1 | | 4/2002 | Eguchi |
| 6,375,330 | B1 | * | 4/2002 | Mihalakis .................. 353/31 |
| 6,390,626 | B2 | * | 5/2002 | Knox .................. 353/20 |

FOREIGN PATENT DOCUMENTS

| EP | 1 072 935 | 1/2001 |
|---|---|---|
| JP | 07113904 | 5/1995 |
| JP | 07294918 | 11/1995 |
| JP | 08297203 | 11/1996 |
| JP | 08334620 | 12/1996 |
| JP | 11249076 | 9/1999 |
| WO | WO01/26384 | 4/2001 |

OTHER PUBLICATIONS

U.S. patent application Ser. No. 09/312,917, filed May 17, 1999, Reflective LCD Projection System Using Wide–Angle Cartesian Polarizing Beam Splitter.

U.S. patent application Ser. No. 09/746,933, filed Dec. 20, 2000, Reflective LCD Projection System Using Wide–Angle Cartesian Polarizing Beam Splitter and Color Separation and Recombination Prisms.

U.S. patent application Ser. No. 09/878,575, filed Jun. 11, 2001, Polarizing Beam Splitter.

* cited by examiner

Primary Examiner—Russell Adams
Assistant Examiner—Andrew Sever
(74) Attorney, Agent, or Firm—Bruce E. Black; Iain A. McIntyre

(57) ABSTRACT

LCD projection systems that use reflective LCD imager units commonly use one or more polarization beamsplitters to separate the light incident on the imager from the light reflected by one or more respective imagers. The polarizing beamsplitters introduce astigmatism to the image light from the imagers. According to the present invention, the polarization beamsplitters are adapted to reduce the astigmatism.

48 Claims, 17 Drawing Sheets

PROJECTION SYSTEM HAVING LOW ASTIGMATISM

RELATED CASES

This is a continuation-in-part application of U.S. Ser. No. 09/878,559, filed on Jun. 11, 2001.

FIELD OF THE INVENTION

The present invention is directed generally to systems for displaying information, and more particularly to reflective projection systems.

BACKGROUND

Optical imaging systems typically include a transmissive or a reflective imager, also referred to as a light valve or light valve array, which imposes an image on a light beam. Transmissive light valves are typically translucent and allow light to pass through. Reflective light valves, on the other hand, reflect only selected portions of the input beam to form an image. Reflective light valves provide important advantages, as controlling circuitry may be placed behind the reflective surface and more advanced integrated circuit technology becomes available when the substrate materials are not limited by their opaqueness. New potentially inexpensive and compact liquid crystal display (LCD) projector configurations may become possible by the use of reflective liquid crystal microdisplays as the imager.

Many reflective LCD imagers rotate the polarization of incident light. In other words, polarized light is either reflected by the imager with its polarization state substantially unmodified for the darkest state, or with a degree of polarization rotation imparted to provide a desired grey scale. A 90° rotation provides the brightest state in these systems. Accordingly, a polarized light beam is generally used as the input beam for reflective LCD imagers. A desirable compact arrangement includes a folded light path between a polarizing beamsplitter (PBS) and the imager, wherein the illuminating beam and the projected image reflected from the imager share the same physical space between the PBS and the imager. The PBS separates the incoming light from the polarization-rotated image light. A single imager may be used for forming a monochromatic image or a color image. Multiple imagers are typically used for forming a color image, where the illuminating light is split into multiple beams of different color. An image is imposed on each of the beams individually, which are then recombined to form a full color image.

It is desirable to use as much light generated by the light source as possible. Where the light source generates light over a wide angle, such as an arc lamp, more light can be passed through the imager system using low f-number optics. A problem, termed "polarization cascade" and associated with a conventional PBS, places a lower limit on the f-number of the illumination optics of traditional optical imaging systems. A conventional PBS used in a projector system, sometimes referred to as a MacNeille polarizer, uses a stack of inorganic dielectric films placed at Brewster's angle. Light having s-polarization is reflected, while light in the p-polarization state is transmitted through the polarizer. However, wide angle performance is difficult to achieve using these polarizers, since the Brewster angle condition for a pair of materials is strictly met at only one angle of incidence. As the angle of incidence deviates from Brewster's angle, a spectrally non-uniform leak develops. This leak becomes especially severe as the angle of incidence on the film stack becomes more normal than Brewster's angle. Furthermore, there are contrast disadvantages for a folded light path projector associated with the use of p- and s-polarization.

Since light in a projection system is generally projected as a cone, most of the rays of light are not perfectly incident on the polarizer at Brewster's angle, resulting in depolarization of the light beam. The amount of depolarization increases as the system f-number decreases, and is magnified in subsequent reflections from color selective films, for example as might be found in a color-separating prism. It is recognized that the problem of depolarization cascade effectively limits the f-number of the projection system, thereby limiting the light throughput efficiency.

SUMMARY OF THE INVENTION

There remains the need for an optical imaging system that includes truly wide-angle, fast optical components that may allow viewing or display of high-contrast images with low optical aberration.

Generally, the present invention relates to an apparatus for reducing astigmatism in a projection system that is particularly well suited to reducing astigmatism in LCD projection systems. In particular, the invention is based around an imaging core that includes astigmatism reduction in the polarization beamsplitter.

One particular embodiment of the invention is directed to a projection system that has a light source to generate light. An imaging core includes at least a first reflecting imager and a first polarizing beamsplitter to impose an image on light received from the light source. The first polarizing beamsplitter is adapted to reduce astigmatism in the image light reflected from the reflecting imager. A projection lens system projects the astigmatism-reduced image light from the imaging core.

Another embodiment of the invention is directed to a projection system that has light generating means and imaging core means for imposing an image on light received from the light generating means. The imaging core means includes at least first imager means and first polarization beamsplitting means for polarization mode beamsplitting. At least one of the beamsplitting means is adapted to reduce astigmatism in the image light. A projection lens unit projects the astigmatism-reduced image light from the imaging core means.

Another embodiment of the invention is directed to a polarizing beamsplitter that has a multilayer, polarization sensitive film disposed between covers. An astigmatism reducing element is disposed between opposing outside faces of the covers to reduce astigmatism introduced by the polarizing film.

Another embodiment of the invention is directed to a projection system that has a light source to generate light. An imaging core includes at least a first reflecting imager and a first polarizing beamsplitter to impose an image on light received from the light source. The first polarizing beamsplitter includes a multilayer polarizing film disposed between covers and an astigmatism reducing element to reduce astigmatism introduced by the polarizing film. A projection lens system projects image light received from the imaging core.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
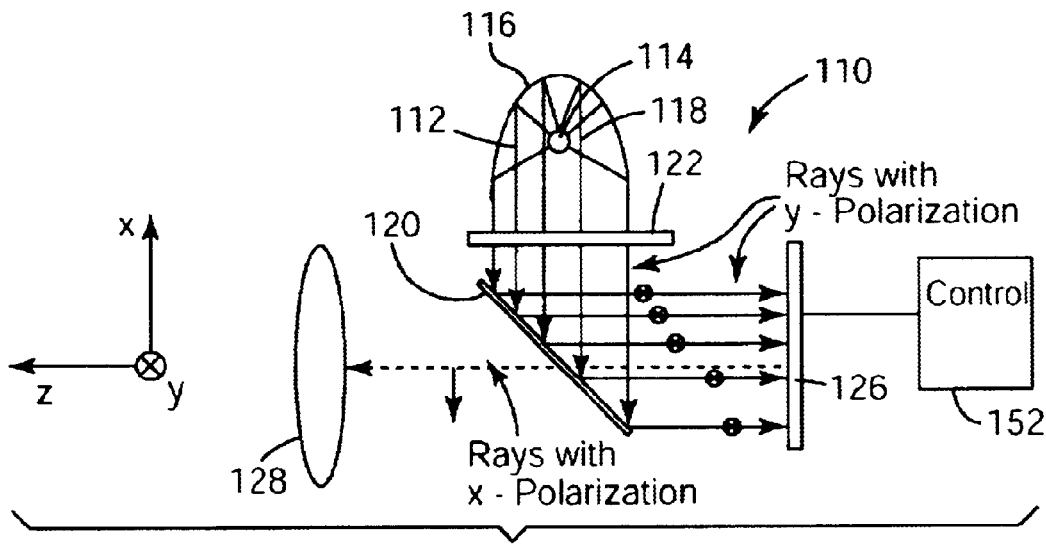
FIG. 1 schematically illustrates an embodiment of a projection unit based on a single reflective imager.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

The present invention is applicable to optical imagers and is particularly applicable to low f-number optical imager systems that produce high quality, low aberration, projected images.

The term optical imager system as used herein is meant to include a wide variety of optical systems that produce an image for a viewer to view, that may be used in, for example, front and rear projection systems, projection displays, head-mounted displays, virtual viewers, heads-up displays, optical computing systems, optical correlation systems and other optical viewing and display systems.

One approach to overcoming the problem of depolarization cascade is to use a wide-angle Cartesian polarization beamsplitter (PBS), as discussed in U.S. patent application Ser. No. 09/312,917, filed on May 17, 1999, and incorporated herein by reference. A Cartesian PBS is a PBS in which the polarization of separate beams is referenced to invariant, generally orthogonal, principal axes of the PBS film. In contrast, with a non-Cartesian PBS, the polarization of the separate beams is substantially dependent on the angle of incidence of the beams on the PBS.

An example of a Cartesian PBS is a multilayer, reflective polarizing beamsplitter (MRPB) film, which is formed from alternating layers of isotropic and birefringent material. If the plane of the film is considered to be the x-y plane, and the thickness of the film is measured in the z-direction, then the z-refractive index is the refractive index in the birefringent material for light having an electric vector parallel to the z-direction. Likewise, the x-refractive index is the refractive index in the birefringent material for light having its electric vector parallel to the x-direction and the y-refractive index is the refractive index in the birefringent material for light having its electric vector parallel to the y-direction. The x-refractive index of the birefringent material is substantially the same as the refractive index of the isotropic material, whereas the y-refractive index of the birefringent material is different from that of the isotropic material. If the layer thicknesses are chosen correctly, the film reflects visible light polarized in the y-direction and transmits light polarized in the x-direction.

One example of an MRPB film is a matched z-index polarizer (MZIP) film, in which the z-refractive index of the birefringent material is substantially the same as either the x-refractive index or the y-refractive index of the birefringent material. The MZIP film has been described in U.S. Pat. Nos. 5,882,774 and 5,962,114, both of which are incorporated by reference. An improved type of MZIP film, having increased lifetime, uses PET/COPET-PCTG as the alternating layers, as is described in U.S. patent application Ser. No. 09/878,575.

One embodiment of system 110 that uses an imager is illustrated in FIG. 1, and includes a light source 112, for example an arc lamp 114 with a reflector 116 to direct light 118 in a forward direction. The light source 112 may also be a solid state light source, such as light emitting diodes or a laser light source. The system 110 also includes a Cartesian PBS 120, for example a wire grid polarizer or an MRPB film. Light with y-polarization, polarized in a direction parallel to the y-axis, is indicated by the circled x. Light with x-polarization polarized in a direction parallel to the x-axis, is indicated by a solid arrow depicting the polarization vector. Solid lines indicate incident light, while dashed lines show light that has been returned from the imager 126 with a changed polarization state. Light, provided by the source 112, is conditioned by conditioning optics 122 before illuminating the PBS 120. The conditioning optics 122 change the characteristics of the light emitted by the source 112 to characteristic that are desired by projection system. For example, the conditioning optics 122 may alter the divergence of the light, the polarization state of the light, and the spectrum of the light. The conditioning optics 122 may include for example, one or more lenses, a polarization converter, a pre-polarizer, and/or a filter to remove unwanted ultraviolet or infrared light. In some embodiments, the conditioning optics 122 may have a low f-number, for example equal to or less than 2.5, in order to use a large fraction of the light from the light source 112.

The y-polarized components of the light are reflected by the PBS 120 to the reflective imager 126. The liquid crystal mode of imager 126 may be smectic, nematic or some other suitable type of reflective imager. If the imager is smectic, the imager 126 may be a ferroelectric liquid crystal display (FLCD). The imager 126 reflects and modulates an image beam having x-polarization. The reflected x-polarized light is transmitted through the PBS 120 and is projected by the projection lens system 128, the design of which is typically optimized for each particular optical system taking into account all the components between the lens system 128 and the imager(s). A controller 152 is coupled to the imager 126 to control the operation of the imager 126. Typically, the controller 152 activates the different pixels of the imager 126 to create an image in the reflected light.

Figure 2:
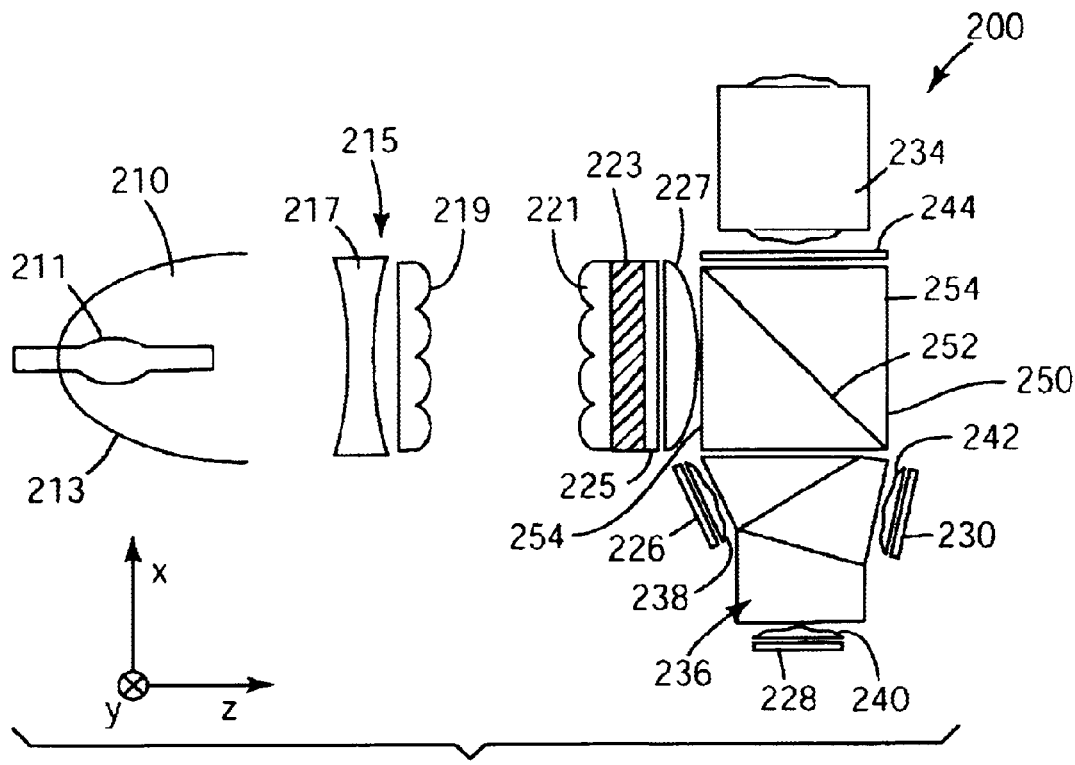
FIG. 2 schematically illustrates another embodiment of a projection unit based on multiple reflective imagers.

Another embodiment of a projection system 200 is illustrated in FIG. 2. The system uses a light source 210, such as an arc lamp 211 having a curved reflector 213, which directs light towards the illumination optics 215. In the illustrated embodiment, the conditioning optics 215 include a collimating lens 217, a first lenslet array 219, a second lenslet array 221 and a condensing lens 227. Between the second lenslet array 221 and the condensing lens 227, the conditioning optics 215 may include an optional polarization converter 223, for example of the Geffkcken-type design. Depending on the conversion efficiency of the polarization converter 223, it may be advantageous to include an optional pre-polarizer 225 following the polarization converter 223. The pair of lenslet arrays 219 and 221 receives nominally collimated light from the collimating lens 217. The polarization converter 223 and the prepolarizer 225 polarize the light incident on the PBS 250 in the desired polarization state. It will be appreciated that the illumination optics may include more or fewer optical components than those described for this particular embodiment.

The lenslet arrays 219 and 221, and the condensing lens 227, shape and homogenize the light in order to illuminate the reflective imagers 226, 228 and 230 evenly. The PBS 250 redirects the y-polarized light towards the three reflective imagers 226, 228 and 230. The PBS 250 typically includes an MRPB film 252, such as an MZIP film, that may be free standing, disposed between plates, or encased between prisms 254, as illustrated. The plates or prisms 254 may be formed from glass and may collectively be referred to as covers for the MRPB film 252.

In a multiple-imager system, a color prism 236 separates the light into separate color bands associated with each imager. For the three-imager configuration illustrated, the color prism 236 typically separates the light into primary color bands: red green and blue. Intervening lenses, such as field lenses 238, 240 and 242, may be inserted between each imager and the color prism 236 to further optimize the optical response of the system. The imagers 226, 228 and 230 modulate the polarization state of the light upon reflection to varying degrees, depending on particular image information. The color prism 236 then recombines the red, green and blue images and passes the combined image light to the Cartesian PBS 250 which analyzes the polarization state of the image by passing substantially only x-polarized light. The y-polarized light is redirected back to the light source 212. The light that passes through the PBS 250 is collected by the projection lens system 234 and may be subsequently focused to a screen (not shown) for viewing. An optional post-polarizer 244 may be inserted between the PBS 250 and the projection lens system 234. It will be appreciated that other optical configurations may be used with multiple imagers.

Figure 3A:
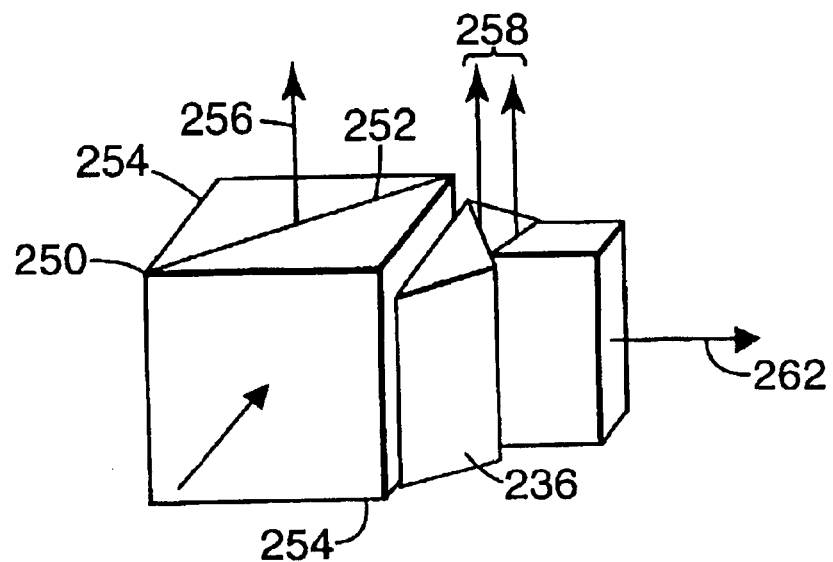
FIGS. 3A and 3B illustrates different orientations of a color prism relative to a polarizing beamsplitter.
Figure 3B:
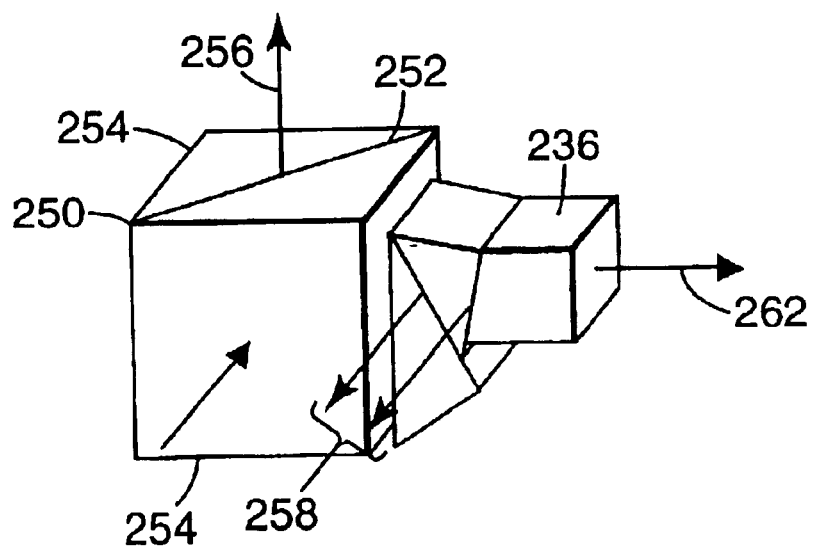

In the illustrated embodiment, the color prism 236 is a Phillips prism, such as is available from Optical Coatings Laboratory, Inc. from Santa Rosa, Calif. For purposes of clarity, the color prism 236 is shown in the conventional orientation with the rotation axes 258 of the first and second color selective surfaces parallel to the rotation axis 256 of the Cartesian PBS 250, as is illustrated in perspective view in FIG. 3A. A rotation axis is an axis about which a surface would be rotated to move from its real position to a position perpendicular to the light propagation direction. While this relative orientation between the rotation axes 258 of the color selective surfaces and the rotation axis 256 of the PBS is often necessary for conventional types of polarizer, a Cartesian PBS 250 also permits the rotation of the color prism 236 about the principle axis 262 of the beam, so that the first and second imagers 226 and 230 are oriented vertically with respect to one another, and the nominally s-polarized light from the PBS is p-polarized with respect to the color selective surfaces of the color prism 236. The rotated arrangement is illustrated in perspective view in FIG. 3B, in which the rotation axes 258 of the color selective surfaces are perpendicular to the rotation axis 256 of the PBS 250. The rotated arrangement is described in U.S. patent application Ser. No. 09/746,933, entitled "Reflective LCD Projection System Using Wide-Angle Cartesian Polarizing Beamsplitter and Color Separation and Recombination Prisms", by David J. W. Aastuen and Charles L. Bruzzone, filed on Dec. 22, 2000, and incorporated herein by reference.

The use of a Cartesian PBS 120 or 250 permits the projection system to demonstrate a dynamic range of at least 100:1 in the visible light range where the conditioning optics 215 have an f-number of 2.5 or less. Furthermore, the components between the conditioning optics 215 and the projection lens system 234, may be referred to as an imaging core. The imaging core typically includes at least a polarizing beamsplitter and one or more imagers. If more than one imager is used, the imaging core may also include color separating and combining optics, such as a color prism, dichroic separator, x-cube or the like. The imaging core does not include lenses, other than optional field lenses disposed between a color separation element and imagers. The imaging core may be telecentric, in which the cone of light incident on the imager is constant over the surface of the imager. Telecentric imager cores typically do not include field lenses.

One embodiment of Cartesian PBS 250 is an MRPB film 252, such as an MZIP film, encased between prisms 254. In order to minimize the birefringence resulting from thermally induced stresses caused by high intensity light beams, the prisms 254 are preferably formed from a material having a low stress-optic coefficient. One of the most suitable materials for this purpose is a glass marketed under the names SF57 (Schott Glass) or PBH55 (Ohara Glass). Both SF57 and PBH55 glass have a refractive index of about 1.85.

The refractive index of the MRPB film 252 is typically less than that of the surrounding prisms 254. For example, the refractive index of an MZIP film is approximately 1.56, and its thickness is typically around 125 μm. In assembling the PBS 250, the MRPB film is attached to the prism faces using approximately 50 μm thick glue with a matching refractive index of about 1.56. One particularly suitable type of glue for use with an MRPB film has been found to be Norland 61, manufactured by the Norland Corporation. Together, the PBS film 252 and the glue form an inclined plate of refractive index of about 1.56 and thickness 225 μm, lying an angle of about 45° to the propagation direction of the light. This relatively low index plate, within relatively higher index prisms 254 introduces astigmatism to the image light. Astigmatism is a problem for light that has been reflected by an imager.

The astigmatism of an inclined plate of refractive index n in a medium of refractive index n' is given by the expression:

$$A = \frac{t}{\sqrt{n^2 - n'^2 \sin^2\theta}} \left[ \frac{n^2 \cos^2\theta}{n^2 - n'^2 \sin^2\theta} \right] \quad (1)$$

where t is the thickness of the slab and θ is the angle between the central ray of the optical beam and the slab. The astigmatism is a result of the differential displacement of the sagittal and tangential beams due to passage through an inclined slab of material having a refractive index different from that of its surroundings.

The values of n and n' are wavelength dependent due to chromatic dispersion, and so the value of the astigmatism is also wavelength dependent. The wavelength dependence of the refractive indices of an MZIP film, typically comprising polyester-like films and co-polymers, and SF57 glass are provided in Tables I and II respectively.

TABLE I

Wavelength Dependence of MZIP Refractive Index

| Wavelength (nm) | Refractive index |
|---|---|
| 435.8 | 1.5745 |
| 480 | 1.5691 |
| 546.1 | 1.5634 |
| 589.6 | 1.5594 |
| 643.8 | 1.5562 |

TABLE II

Wavelength Dependence of SF57 Refractive Index

| Wavelength (nm) | Refractive index |
|---|---|
| 435.8 | 1.8939 |
| 486.1 | 1.872 |
| 546 | 1.855 |
| 587.5 | 1.8466 |
| 656 | 1.8365 |

Using expression (1), astigmatism caused by a 225 μm thick film in SF57 glass prisms is calculated for different colors to be: 169 μm for red light (645 nm), 181 μm for green light (546 nm) and 196 μm for blue light (480 nm). In many cases, it may be sufficient to correct for the astigmatism of the green light, concomitantly reducing the astigmatism of the blue and red portions of the light. The viewer will see a substantially astigmatism-free image where the astigmatism for each color band is less than the depth of field of the projection lens system. Thus perfect cancellation of the astigmatism at all wavelengths is not required. When a single value of astigmatism is provided below, it is assumed to be the value of astigmatism for green light at about 546 nm. In other approaches, the astigmatism for different color bands may be corrected separately.

A first approach to eliminating astigmatism introduced by an inclined plate of relatively low refractive index surrounded by a material of relatively high refractive index is to propagate the light through a second inclined plate that has a refractive index lower than its surrounding material and that is inclined about a rotation axis perpendicular to that of the first plate. The second inclined plate may be formed from any suitable solid, liquid or gaseous material. If the second plate is identical to the first one, in terms of refractive index and thickness, then it should be inclined at the same angle as the first plate in order to minimize the astigmatism. If the second plate is not identical to the first plate, then the magnitude of the astigmatism introduced by the second plate is preferably the same as that introduced by the first plate in order to cancel the astigmatism completely. This requires selection of angle and thickness of the plate and the refractive index difference between the second plate and its surroundings. In the designs discussed below, spherical aberration and coma are sufficiently small that they can be ignored for practical purposes. However, compensation for spherical aberration and coma may be required in an optical system, in addition to astigmatism compensation. Since the introduction of astigmatism compensation may increase other aberrations, it may be preferred to compensate the astigmatism partially in order to achieve a balance among aberrations.

A second approach to eliminating astigmatism introduced by a first inclined plate having a relatively low refractive index compared to its surrounding material is to introduce a second inclined plate having a refractive index higher than the surrounding material. The second inclined plate may be formed of a solid, liquid or gaseous material. The second inclined plate is typically inclined about a rotation axis that is parallel to the rotation axis of the first inclined plate. This requires selection of the material thickness, refractive index and angle of inclination in order to provide compensation for the astigmatism. Specific embodiments using this approach to eliminate astigmatism are discussed later.

The approaches to reducing astigmatism discussed herein are applicable to projection systems having a wide range of f-numbers, and are believed to be particularly advantageous for projection systems having low f-numbers. The approaches discussed herein may be used to reduce astigmatism or to substantially correct the astigmatism. In many cases, the astigmatism need not be completely cancelled, but need only be reduced to a value less than the depth of field of the projection lens system. The depth of field typically increases with f-number, and so astigmatism correction becomes increasingly more important for low f-number projection systems. The term "substantially correct" means that the astigmatism is reduced to a value less than the depth of field of the projection lens system that is being used.

Although the discussion herein is directed to reducing astigmatism that arises in a MRPB PBS, it will be appreciated that the approaches to reducing astigmatism discussed below are also useful for reducing astigmatism that arises in other components of a projection system.

Astigmatism reduction may be introduced based on adaptation of the color prism. Referring again to FIGS. 3A and 3B, in general, when the rotation axes 258 are perpendicular to the rotation axis 256, astigmatism correction is introduced into the color prism 236 using a plate of relatively low refractive index compared to its surroundings. In contrast, when the rotation axes 258 of the color selecting surfaces are parallel to the rotation axis 256 of the PBS, astigmatism correction is introduced to the color prism using a plate of relatively high refractive index compared to its surroundings.

First we discuss a specific embodiment of the invention that uses a second inclined plate having a relatively low refractive index. Different designs of color prisms 236 are available, several of which include three or four prisms used for separating the light into two or more color bands. Often a color prism 236 separates the light into its red, green and blue components. In the Philips Prism construction, illustrated in FIG. 4, the color prism 400 is formed from three prisms 402, 404 and 406. Light 410 entering the first prism 402 is incident on the first filter 412, which reflects light in the first color band and transmits light in the second and third color bands. The light in the first color band 414 is totally internally reflected at the input surface 416 to the first prism, since there is an air gap 417 between the input surface 416 and the PBS 450, and is directed to the first imager 426.

The light transmitted into the second prism 404 is incident on the second filter 418, which reflects light 420 in the second color band and transmits light 424 in the third color band. The light 420 reflected by the second filter 418 is totally internally reflected at the gap 422, typically an air gap, between the first and second prisms 402 and 404, and is directed to the second imager 428. The light 424 transmitted through the second filter 418 is directed through the third prism 406 to the third imager 430.

Typically, the first color band is blue, the second color band is red and the third color band is green. This need not be the case, however, and the different color bands may have different colors.

The gap 422 between the first and second prisms 402 and 404 is conventionally kept small, typically in the range 10 $\mu$m to 25 $\mu$m, which is sufficient to permit total internal reflection to take place for the second color band. However, the gap 422 may be increased in size in order to provide astigmatism compensation, as is discussed further in the following example.

EXAMPLE 1

The color prism 400 was formed from low birefringence glass, PBH55, having a refractive index of 1.85. The angle of incidence of the central ray onto the air gap 422 was 21°. The first color band was blue, the second color band was red and the third color band was green. The color prism 400 was in the rotated position relative to the PBS 450, so that the nominally s-polarized light from the PBS 450 was p-polarized in the color prism 400.

The size of the air gap was adjusted to compensate for an astigmatism value of 181 $\mu$m. Before adjustment, the PBS/color prism assembly was used in a projector system that projected a pattern of horizontal and vertical lines on a screen. It was possible to focus on either the horizontal lines or vertical lines, but not both simultaneously. If, for example, the horizontal lines were focused at 178 cm distance from the projection lens, then the vertical lines were in focus at 105 cm, a focal distance ratio of 1.7:1. If the best simultaneous focus were used, then both sets of lines became significantly blurred.

To adjust the gap 422, the first and second prisms 402 and 404 were separated and then re-assembled with an air gap 422 of 100 $\mu$m using Monosized Microsphere Size Standard Beads from Duke Scientific Corp., Palo Alto, Calif., as spacers. The beads had a diameter of 100 $\mu$m.

After reassembling with the 100 $\mu$m gap 422, the astigmatism of the system was again measured for red and green light. The vertical lines focused at 135 cm whereas the horizontal lines focused at 178 cm, a focal distance ratio of 1.32:1. Furthermore, the qualitative appearance of the lines when the focus was optimized was dramatically improved from the situation where the gap 422 was 10 $\mu$m.

The gap 422 was readjusted to 140 $\mu$m by replacing the 100 $\mu$m spacer beads with 140 $\mu$m spacer beads, also from Duke Scientific. When tested for astigmatism, it was difficult to quantify the difference between the focal points of the vertical and horizontal lines. It appeared that the saggital rays were focused between 160 and 170 cm from the projector, for a focal ratio of less than 1.1:1. When re-focused to provide the best overall focus, there was no apparent blur to either the vertical or horizontal lines.

It will be appreciated that adjusting the air gap 422 does not affect the astigmatism for the light 414 in the first color band. A qualitative test was made to determine whether correction of the red and green astigmatism alone would lead to an acceptable image. The blue, red and green images were carefully aligned and images of different contrast were observed. It was determined that any blue blur could only be discerned by careful examination of white lines on a dark background, but was not noticeable for dark lines on a bright background. This suggests that reduction of the blue astigmatism may not be as important as reduction of green and red astigmatism. A possible reason for this is that the density of blue receptors in the human eye is less than that for green and red receptors, and so the normal resolution of blue images is less than for green or red images.

Figure 4:
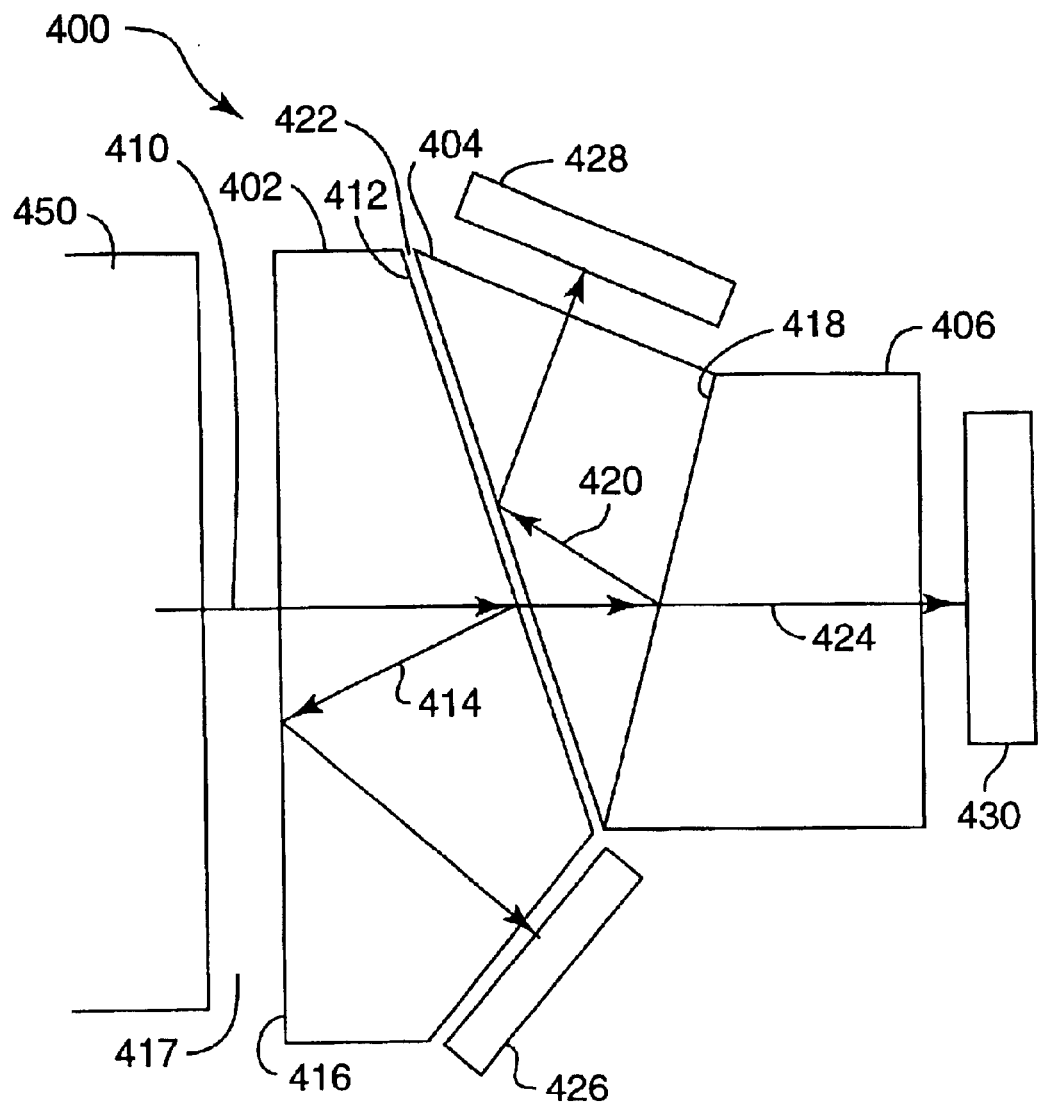
FIG. 4 schematically illustrates an embodiment of a projector system according to the present invention.
Figure 5:
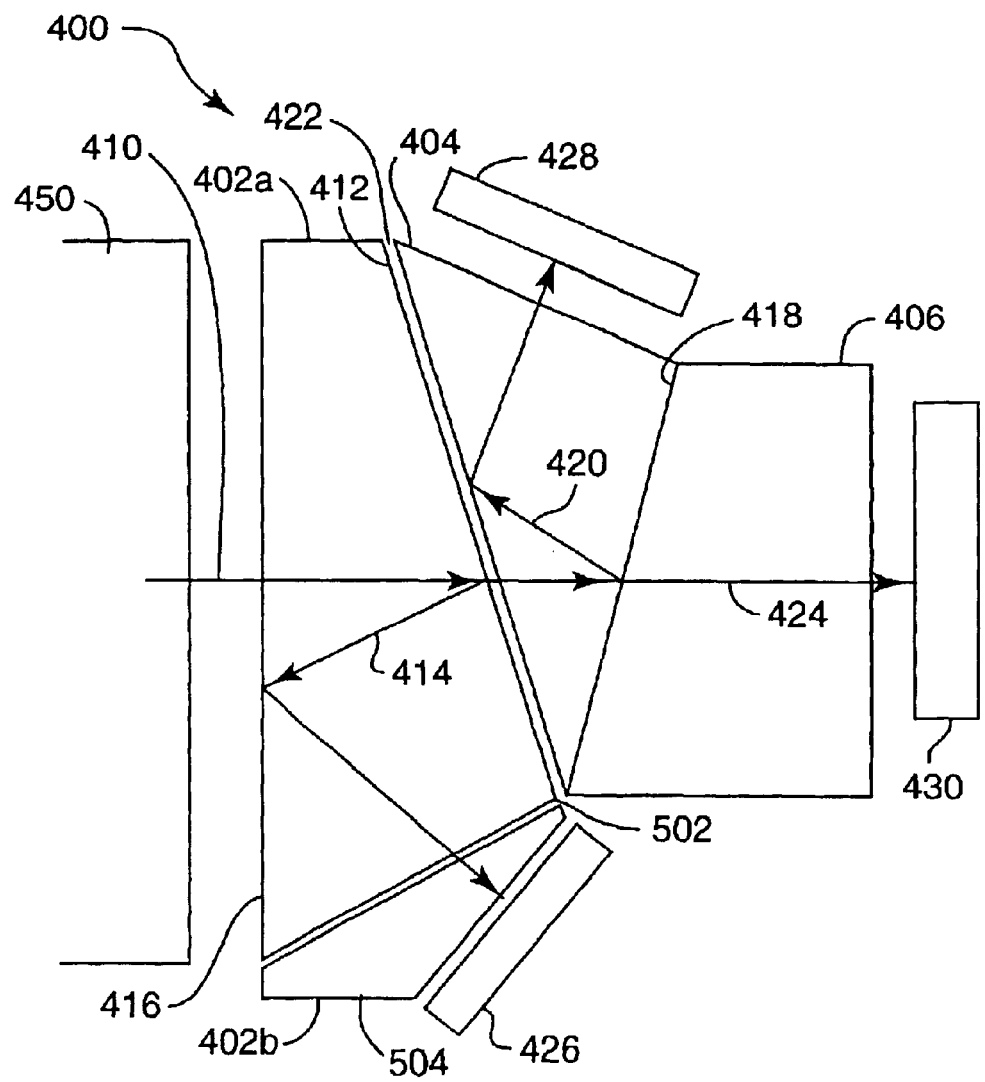
FIG. 5 schematically illustrates another embodiment of a projector system, according to the present invention.

Astigmatism for the first color band may be corrected, however, using the approach illustrated in FIG. 5, which shows a color prism similar to that illustrated in FIG. 4, except that the first prism 402 is formed from two parts 402a and 402b, with an air gap 502 therebetween. A blunt tip 504 is desired on the acute angle end of prism 402b for manufacturing reasons. Preferably, the size and position of the gap 502 are such that the air gap 502 does not obstruct the light 410 entering the color prism 400 from the PBS 450. Also, the size and position of the gap 502 are such that the gap 502 is not in the path of the light 414 of the first color band until the light 414 has totally internally reflected off the input face 416. Using expression (1) above, the air gap 502 should be around 0.875 mm in width, at an angle of about 32.25°, to compensate for an astigmatism of 196 $\mu$m, whereas the astigmatism corrected for in the other gap 422 may be of a different value. While this rather large separation may induce other aberrations, it is possible to use smaller gaps that introduce smaller aberrations, in order to partially compensate the astigmatism. Those skilled in the art will appreciate that it is possible to optimize the image either through optical simulations on a computer, or through empirical trials.

It will be appreciated that the air gaps 422 and 502 are examples of sheets of lower refractive index material, air, surrounded by higher index material, for example prism glass. The gaps 422 and 502 need not be filled only with air, although air is useful since it gives a large refractive index difference with the prism material. The gaps 422 and 502 may also be filled with another material of a relatively low refractive index, other than air. It will be understood, however, that the refractive index difference between, for example the second prism 404 and the gap 422, should be sufficient to maintain total internal reflection of the light 420, even when the gap 422 is not filled with air. Likewise, other gaps discussed below need not be filled with air, but need only be filled with a material that has a lower refractive index than the material surrounding the gap.

Figure 6:
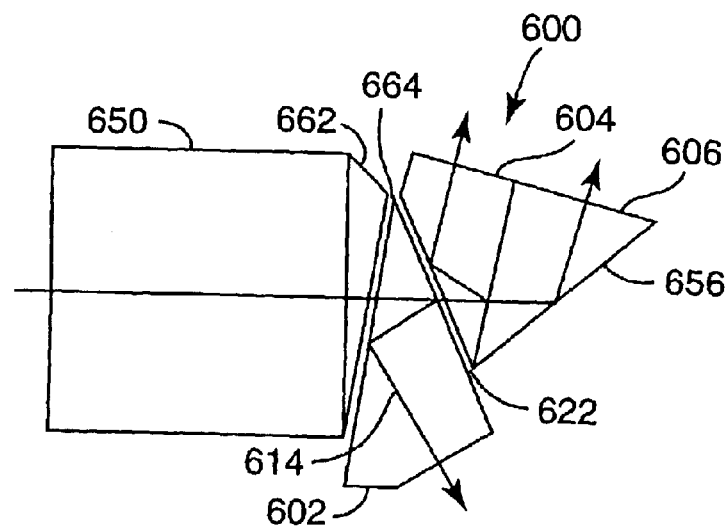
FIG. 6 schematically illustrates an embodiment of a color prism, according to the present invention.

Another approach to correcting the astigmatism is described with reference to FIG. 6. In this embodiment, a wedge prism 662 is disposed between the color prism 600 and the PBS 650, with a gap 664 between the wedge prism 662 and the color prism 600. The color prism 600, known as a modified Philips prism, is formed from first, second and third prisms 602, 604 and 606, with a totally internally reflecting gap 622 between the first and second prisms 602 and 604. In the illustrated embodiment, the third prism 606 also includes a totally internally reflecting surface 656. This need not be the case, and the third prism 606 may be formed using a geometry that does not include a totally reflecting surface.

In conventional wedge prism systems, the air gap 664 between the wedge prism 662 and the first prism 602 is only sufficiently large as to permit total internal reflection of light 614 of the first color band reflected within the first prism 602. However, the air gap 664 between the wedge prism 662 and the first prism 602 may be selected to have a larger width so as to substantially reduce and correct the astigmatism arising within the PBS 650. The width of the gap 664 is selected according to expression (1).

For example, where the astigmatism of the PBS 650 is 181 $\mu$m, and the wedge angle of the wedge prism 662 is 10°, expression (1) suggests that the astigmatism may be corrected by an air gap 664 of around 2.104 mm.

It will be appreciated that, although the low index plate has been described with reference to FIGS. 4–6 as an air gap, other materials having a low refractive index may also be used, for example a low index polymer film. Furthermore, it is possible to use a combination of gaps between prisms of the color prism and a gap between the color prism and the wedge prism to compensate for astigmatism. It will further be appreciated that astigmatism reduction may be implemented in different embodiments of color prisms other than those illustrated here.

The second approach to correcting for the astigmatism in the PBS introduced above is to introduce a plane of relatively high refractive index that is inclined about an axis parallel to the axis of inclination of the PBS polarizer film. This approach is useful where the color prism is not rotated relative to the PBS and, therefore, the nominally s-polarized light from the PBS is also nominally s-polarized within the color prism.

Figure 7:
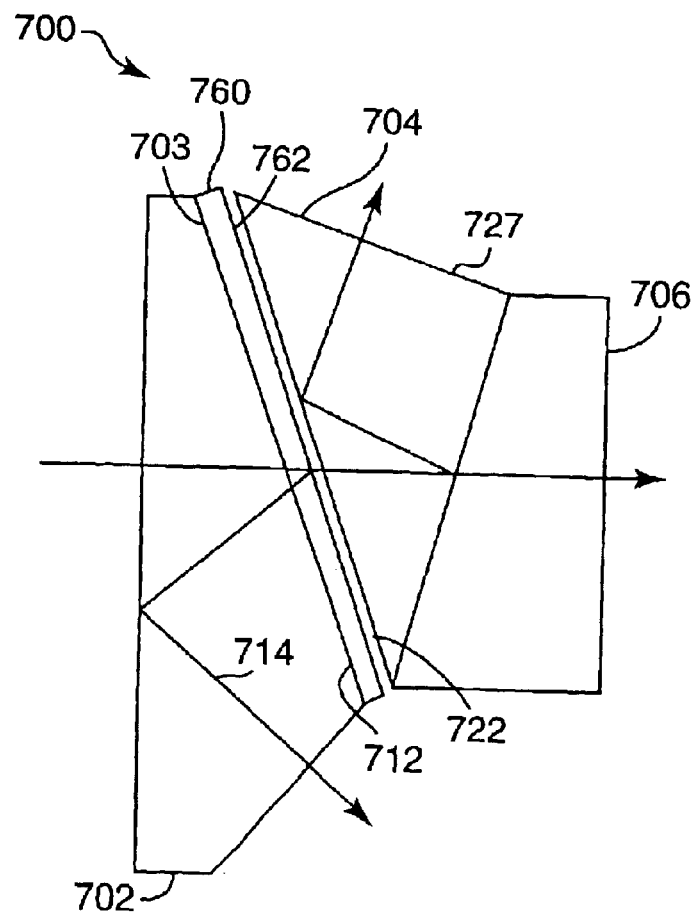
FIG. 7 schematically illustrates another embodiment of a color prism, according to the present invention.

One particular embodiment of this approach is illustrated in FIG. 7, which shows a color prism 700 formed from first, second and third prisms 702, 704 and 706. A high index plate 760, formed from a transparent material having a higher refractive index than the first and second prisms 702 and 704 is disposed on the output surface of the first prism 702. An air gap 722, typically about 10 $\mu$m wide, is provided between the high index plate 760 and the second prism 704 so that light in the second color band is internally reflected within second prism 704 towards the output face 727.

Where the first filter 712 is disposed on the second surface 762 of the high index plate 760, the light in the first color band 714 passes through the high index plate twice before exiting the first prism 702, whereas the light 720 in the second color band and the light 724 in the third color band only pass through the high index plate 760 once before exiting the second and third prisms 704 and 706. Thus, the light in the first color band experiences a different amount of astigmatism correction from the second and third color bands. Since the astigmatism of blue light is less significant to the viewer's perception of an image than green or red light, as has been discussed above, this embodiment may provide adequate astigmatism compensation where the first color band is blue light.

Where the first filter 712 is placed on the output surface 703 of the first prism, as illustrated, the light 714 in the first color band does not pass through the high index plate 760, and so the light 714 in the first color band experiences no astigmatism correction. As is discussed above, where the light 714 in the first color band is blue, the astigmatism correction to the green and red light only may provide sufficient correction for viewing.

Figure 8:
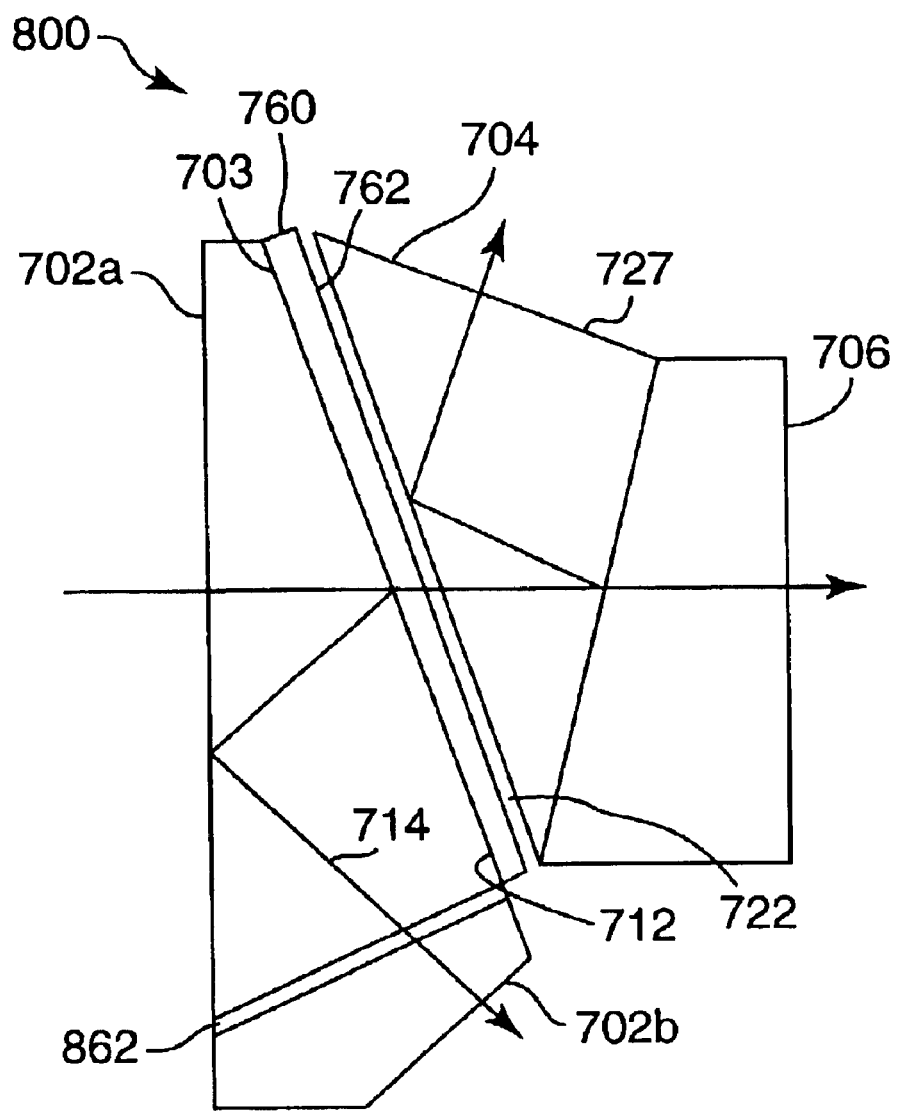
FIG. 8 schematically illustrates another embodiment of a color prism, according to the present invention.

In another embodiment, illustrated in FIG. 8, the first prism 702 may be split into two parts 702a and 702b. A second high index plate 862 may be positioned between the prism parts 702a and 702b, having a thickness, angle of orientation and refractive index selected to reduce astigmatism in the first color band. This embodiment is particularly useful where the filter 712 is positioned between the first prism part 702a and the high index plate 760. Thus, the color prism 800 may provide correction for all three color bands.

Astigmatism correction may also be implemented in an X-cube beamsplitter/combiner. An embodiment of a projection engine 900 that uses an X-cube beamsplitter and combiner is partially illustrated in FIG. 9. Light 902 from a light source (not shown) is incident on an X-cube beamsplitter 904, that separates the light 902 into three color bands. Light 906 in the first color band is transmitted through the X-cube beamsplitter 904 to the first reflector 908, while light 910 in the second color band is reflected by the X-cube beamsplitter 904 into the plane of the figure towards the second reflector 912. Light 914 in the third color band is reflected in a direction out of the plane of the figure towards a third reflector. Optical elements for operating on the third color band are not shown in the figure for the sake of clarity. In the projection engine 900 that uses three PBSs, the back focal length may be reduced, thus permitting the use of a simplified projection lens system. Furthermore, the weight of the projection lens system required for wide field angle may be reduced.

The first and second reflectors 908 and 912 respectively reflect light in the first and second color bands towards first and second polarizing beamsplitters 916 and 918. The first and second reflectors may be mirrors, for example multilayer mirrors or metal mirrors, or may be reflecting polarizers oriented to reflect light in the desired polarization state towards the first and second polarizing beamsplitters 916 and 918.

Light in the first color band 906 is reflected by the first PBS 916, having an MPBR film 917, towards a first reflecting imager 920 that reflects the light 906 in the first color band and rotates polarization of selected portions of the wavefront of the light 906 to create an imaged beam 922 of light in the first color band that is transmitted through the first PBS 916 to the X-cube combiner 924. Similarly, light 910 in the second color band is reflected by the second PBS 918 towards the second reflecting imager 926. The second reflecting imager 926 produces an imaged beam 928 of light in the second color band that is transmitted through the second PBS 918 towards the X-cube combiner 924.

It will be appreciated that the projection engine 900 also includes a third reflector (not shown), a third PBS (not shown) and a third imager (not shown) to produce an imaged beam 930 of light in the third color band that is directed to the X-cube combiner 924 from a direction out of the plane of the figure. The three imaged beams 922, 928 and 930 are combined in the X-cube combiner to produce a three color image beam 932 that is typically projected to a screen by a set of projection optics.

Figure 10A:
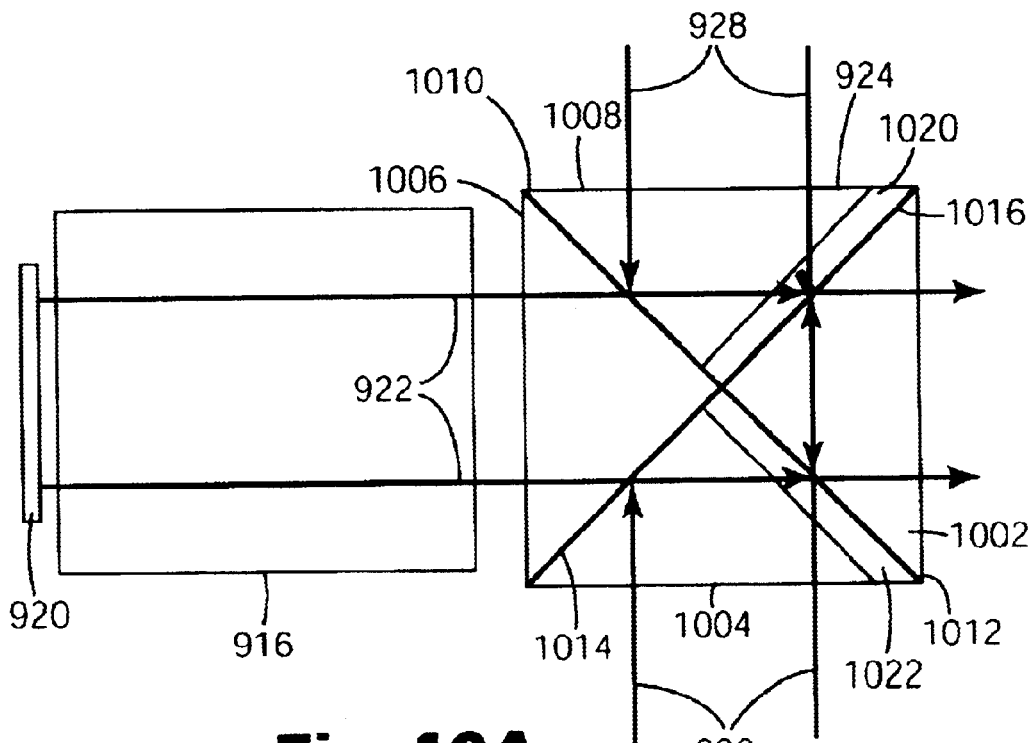
FIGS. 10A and 10B illustrate different orientations of an x-cube color combiner relative to a polarization beamsplitter, according to embodiments of the present invention.

A more detailed illustration of the X-cube combiner 924 is presented in FIG. 10A, showing a cross-section through the X-cube combiner in the plane of the imaged beams 922, 928 and 930. The X-cube combiner 924 is assembled from four right-angled prisms 1002, 1004, 1006 and 1008, having various reflective coatings, for example multilayer dielectric reflective coatings, between certain interfaces of the prisms 1002–1008. Coatings 1010 and 1012 reflect the imaged beam 928 in the second color band and coatings 1014 and 1016 reflect the imaged beam 930 in the third color band.

Two slabs 1020 and 1022 are inserted into the X-cube combiner 924 in positions so that the light in each imaged beam 922, 928 and 930, except for a small central portion of the first imaged beam 922, passes through either one of the slabs 1020 or 1022 only once. In the illustrated embodiment, the first slab 1020 is disposed between the fourth prism 1008 and the first prism 1002, and the second slab 1022 is disposed between the first and second prisms 1002 and 1004.

Figure 9:
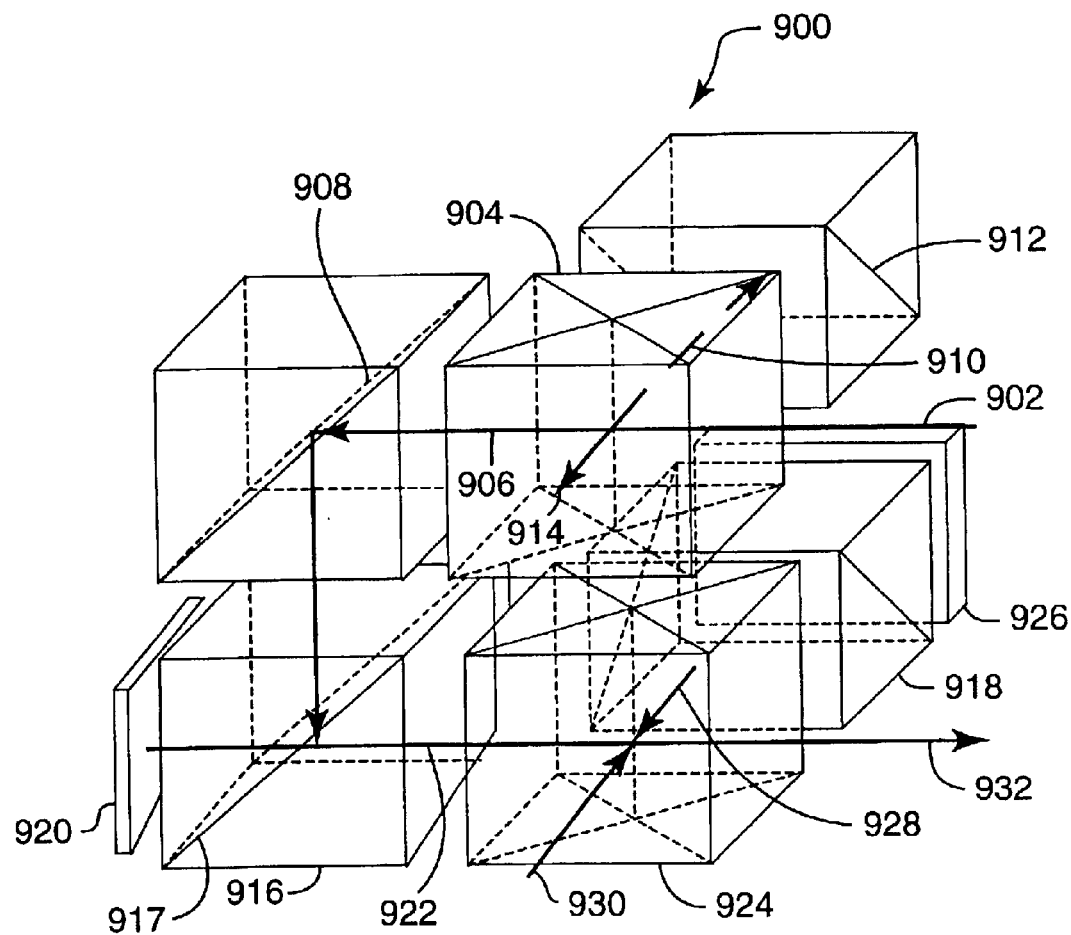
FIG. 9 schematically illustrates an embodiment of a projection engine having an x-cube color combiner, according to the present invention.

In the embodiment illustrated in FIGS. 9 and 10A, the axis of rotation of the MPBR film 917 and the axes of rotation of the slabs 1020 and 1022 are perpendicular. Therefore, the refractive index of the slabs 1020 and 1022 is selected to be less than the refractive index of the prisms 1002–1008. For example, the prisms may be formed from SF57 glass, whereas the slabs 1020 and 1022 are formed from a lower index glass, such as BK7, having a refractive index of 1.517. The thickness of the slabs 1020 and 1022 is preferably selected to at least partially compensate for the astigmatism arising in the PBSs. For example, where the astigmatism is 181 $\mu$m, the prisms 1002–1008 are formed from SF57 glass, and the slabs 1020 and 1022 are formed from BK7, the astigmatism is corrected where the slab thickness is 150 $\mu$m. It is assumed that the angle of incidence in the X-cube combiner 924 is 45°.

The central portion of the first imaged beam 922, having a width d1, does not make a single pass through the entire thickness of either of the slabs 1020 and 1022, and so is may not be corrected for astigmatism. Typically, the area of the central portion is small relative to the clear aperture of the beam 922, and so the amount of light that is not corrected for astigmatism is small, a few % of the total output light. The central portion may be uncorrected for astigmatism, or may be blocked, for example using black paint, which produces less than 5% power loss. The overall effect of not correcting the central portion of the beam 922 may be reduced if the beam 922 contains light of a color band that produces a smaller astigmatism effect in the viewer's eye, for example blue light.

Figure 10B:
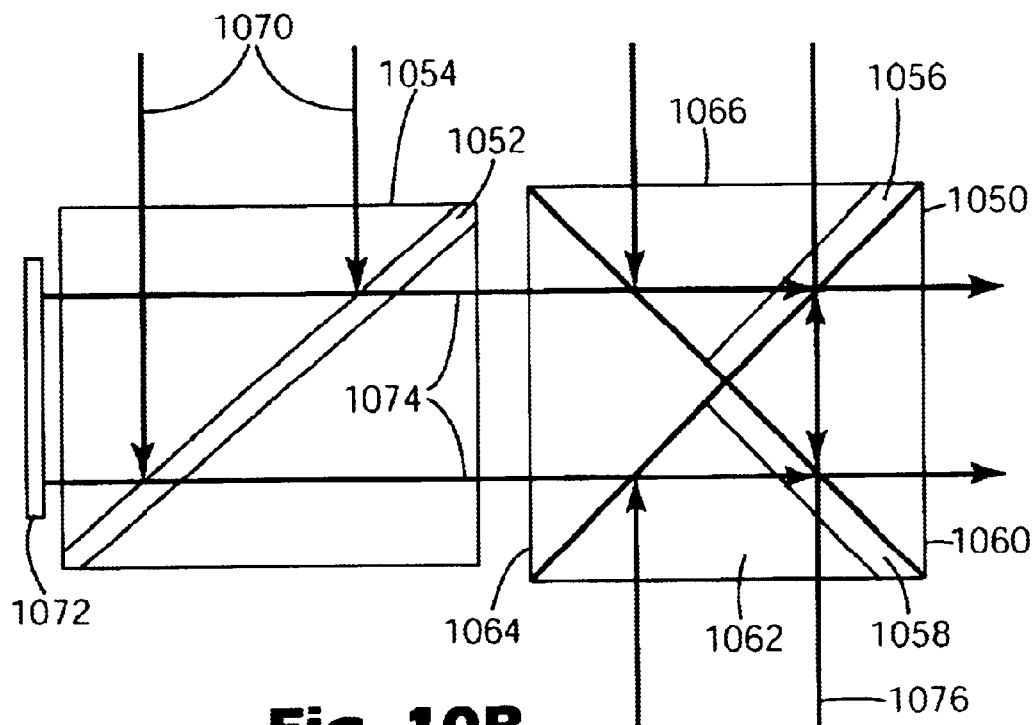

Another embodiment of X-cube combiner 1050 is illustrated in FIG. 10B. Light 1070, of one color band, enters the PBS 1054 and is reflected to the imager 1072, which rotates polarization of certain portions of the light 1070 to form image light 1074. The image light 1074 is transmitted through the PBS 1054 to the X-cube combiner 1050. Image light 1076 of one or more color bands is directed into the X-cube combiner 1050 and combined with the image light 1074.

In this embodiment, the rotation axis of the MPBR film 1052 in the PBS 1054 is parallel to the axis of rotation of the slabs 1056 and 1058. Accordingly, the refractive index of the slabs 1056 and 1058 is selected to be greater than the refractive index of the prisms 1060–1066 that form the X-cube combiner.

The glass selection for the X-cube combiner 1050 is not limited to high index glasses, and so the combiner 1050 may be formed from a more common type of glass, such as BK7. If the astigmatism introduced by PBS 1054 is around 181 $\mu$m, then the thickness of the slabs 1056 and 1058 needed to achieve astigmatism correction is calculated to be around 1.1 mm where the slabs 1056 and 1058 are formed from PBH71 glass and the prisms 1060–1066 are formed from BK7.

Figure 11:
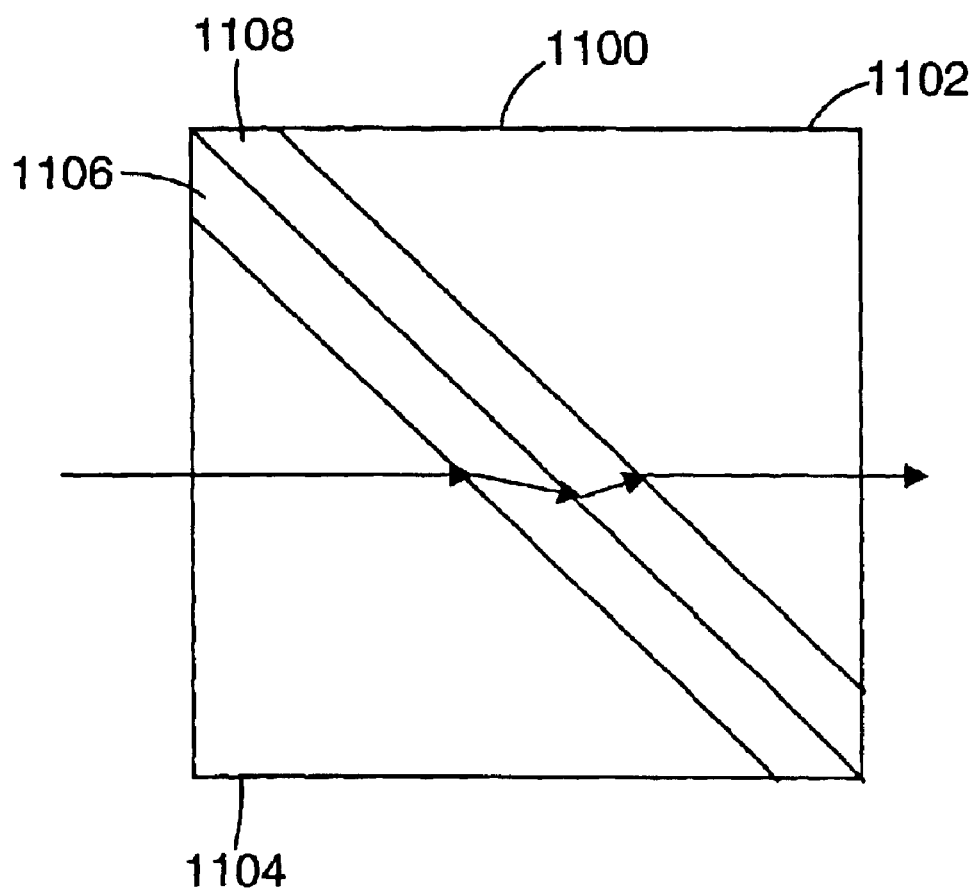
FIG. 11 schematically illustrates an embodiment of a polarization beamsplitter according to the present invention.

Another particular embodiment of astigmatism correction in a projector system that uses a plate of a relatively high refractive index material, illustrated in FIG. 11, is to include the plate of relatively high refractive index material in the PBS 1100.

The PBS 1100 is formed from two prisms 1102 and 1104 with two layers, an MRPB/adhesive layer 1106 and a high index layer 1108, sandwiched between the prisms 1102 and 1104. The refractive index, $n_2$, of the high index layer 1108 is higher than the refractive index, $n_0$, of the prisms 1102 and 1104. Where the refractive index of the MRPB/adhesive layer 1106 is given by $n_1$, the following relationship holds: $n_2 > n_0 > n_1$. The thickness, $d_2$, of the high index layer 1108, is selected so that the astigmatism introduced by the high index layer 1108 reduces the astigmatism arising from the MRPB/adhesive layer 1106. For example, where the prisms 1102 and 1104 are formed from PBH55 glass with a refractive index of 1.85 and the MRPB/adhesive layer 1106 has a thickness of 225 $\mu$m with a refractive index of 1.56, the astigmatism is 181 $\mu$m. This value of astigmatism may be compensated using a 3.8 mm thick layer of PBH71 glass, having a refractive index of 1.92, as the high index layer 1108. It will be appreciated that an adhesive layer may be used for attaching the high index layer to the prism: the effect of such an adhesive layer has been ignored here for simplicity. Chromatic dispersion in the PBS 1100 may lead to color shift effects where light at one color is translated across the image relative to light of another wavelength. The effect of color shift may be reduced using, for example, a second PBS following the first PBS, where the second PBS is oriented to transmit the image light and to provide a color shift that compensates for the color shift arising in the first PBS 1100.

The PBS 1100 may be used where there is only one imager, and no color prism is present. One of the advantages of using only a single imager is that there is no need to align the image formed by one imager over the image formed by another imager, as is the case in a multiple-imager projection engine. Another advantage is that, since there is no requirement for a color separator/combiner, such as a color prism, x-prism, or the like, the back focal length of the engine can be reduced, and so low f-number projection lens systems may be used, for example as low as f/1.8 or less.

Usually, single panel imagers operate with some kind of color selection schemes, such as a color wheel or fast tunable color filters. Accordingly, only about one third of the light incident on the imager, contained within one of three color bands, is used at any one time, and so high light efficiency is even more desirable in a single panel engine than in a three panel engine. With an f-number of f/1.8, the system étendue is 2.7 times greater than that of an engine having an f-number of f/3.0, and so the total light throughput of the engine is increased at lower f-numbers. Additionally, the coherence length of the projection engine is reduced at lower f-number, resulting in lower speckle.

Figure 16:
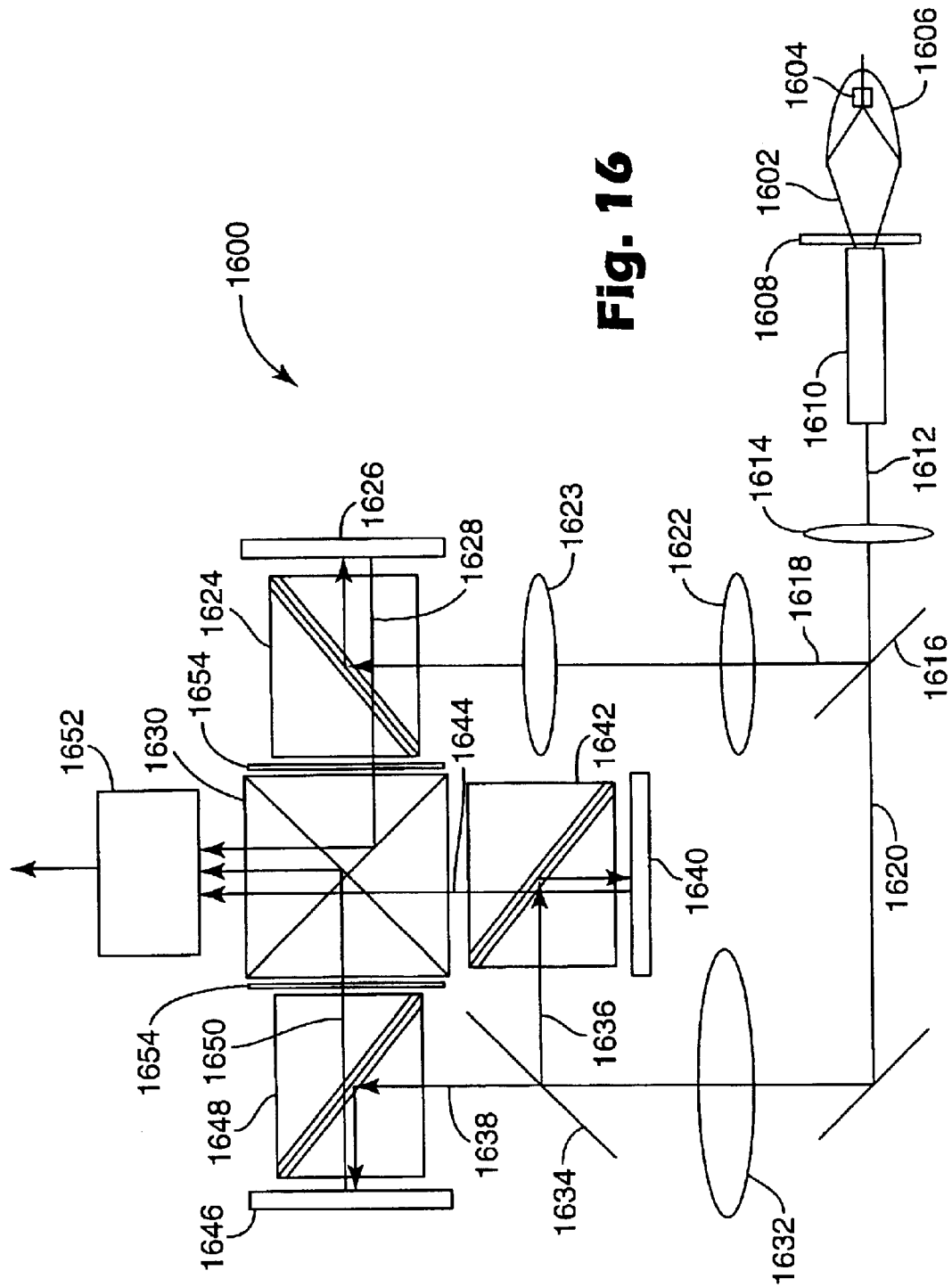
FIG. 16 schematically illustrates a projection system that uses at least one astigmatism-reducing polarizing beamsplitter, according to an embodiment of the present invention.

An embodiment of a multi-imager projection system 1600, in which astigmatism reduction is achieved by providing astigmatism compensation in the PBS's themselves, is schematically illustrated in FIG. 16. Light 1602 is emitted from a source 1604. The source 1604 may be an arc or filament lamp, or any other suitable light source for generating light suitable for projecting images. The source 1604 may be surrounded by a reflector 1606, such as an elliptic reflector (as shown) a parabolic reflector, or the like, to increase the amount of light directed towards the projection engine.

The light 1602 is typically treated before being split into different color bands. For example, the light 1602 may be passed through an optional re-polarizer 1608, so that only light of a desired polarization is directed towards the projection engine. The pre-polarizer may in the form of a reflective polarizer, so that reflected light, in the unwanted polarization state, is redirected to the light source 1604 for re-cycling. The light 1602 may also be homogenized so that the imagers in the projection engine are uniformly illuminated. One approach to homogenizing the light 1602 is to pass the light 1602 through a reflecting tunnel 1610, although it will be appreciated that other approaches to homogenizing the light may also be employed.

In the illustrated embodiment, the homogenized light 1612 passes through a first lens 1614 to reduce the divergence angle. The light 1612 is then incident on a first color separator 1616, which may be, for example, a dielectric thin film filter. The first color separator 1616 separates light 1618 in a first color band from the remaining light 1620.

The light 1618 in the first color band may be passed through a second lens 1622, and optionally a third lens 1623, to control the divergence of the light 1618 in the first color band incident on the first PBS 1624. The light 1618 passes from the first PBS 1624 to a first imager 1626. The imager reflects image light 1628 in a polarization state that is transmitted through the PBS 1624 to an x-cube color combiner 1630. The PBS 1624 may provide astigmatism compensation to the reflected image light. For example the PBS 1624 may similar to the PBS 1100 described with respect to FIG. 11. The imager 1626 may include one or more compensation elements, such as a retarder element, to provide additional polarization rotation and thus maximum contrast in the image light.

The remaining light 1620 may be passed through a third lens 1632. The remaining light 1620 is then incident on a second color separator 1634, for example a thin film filter or the like, to produce a light beam 1636 in a second color band and a light beam 1638 in a third color band. The light 1636 in the second color band is directed to a second imager 1640 via a second PBS 1642. The second PBS 1642 may provide astigmatism compensation to light in the second color band. The second imager 1640 directs image light 1644 in the second color band to the x-cube color combiner 1630.

The light 1638 in the third color band is directed to a third imager 1646 via a third PBS 1648. The third PBS 1648 may provide astigmatism compensation to light in the third color band. The third imager 1646 directs image light 1650 in the third color band to the x-cube color combiner 1630.

The image light 1628, 1644 and 1650 in the first, second and third color bands is combined in the x-cube color combiner 1630 and directed as a full color image beam to projection optics 1652. Polarization rotating optics 1654, for example half-wave retardation plates or the like, may be provided between the PBS's 1624, 1642 and 1648 and the x-cube color combiner 1630 to control the polarization of the light combined in the x-cube color combiner 1630. In the illustrated embodiment, polarization rotating optics 1654 are disposed between the x-cube color combiner 1630 and the first PBS and third PBS's 1624 and 1648.

It will be appreciated that variations of the illustrated embodiment may be used. For example, rather than reflect light to the imagers and then transmit the image light, the PBS's may transmit light to the imagers and then reflect the image light.

There are several advantages to the projection system illustrated in FIG. 16. One advantage arises from the fact that the multiple layer film PBS may be in the form of a wide-angle Cartesian beamsplitter, unlike a McNeille polarizer. Thus, the multiple layer film PBS permits the use of fast illumination optics, for example having an f-number of 2.5 or less, and so the overall efficiency of the projection system may be increased. Another advantage arises from the fact that the multiple layer film PBS's may each be optimized for their respective color bands, and so the polarization contrast of the image light in each color band is high. As a consequence, the projection system may operate without post-polarizers. Furthermore, only a single pre-polarizer may be used to cover all color bands, rather than using a separate pre-polarizer for each color band. Another advantage of this embodiment is that the multiple layer film PBS is relatively insensitive to angular alignment, and so the system projection system 1600 is easier to align.

Figure 17:
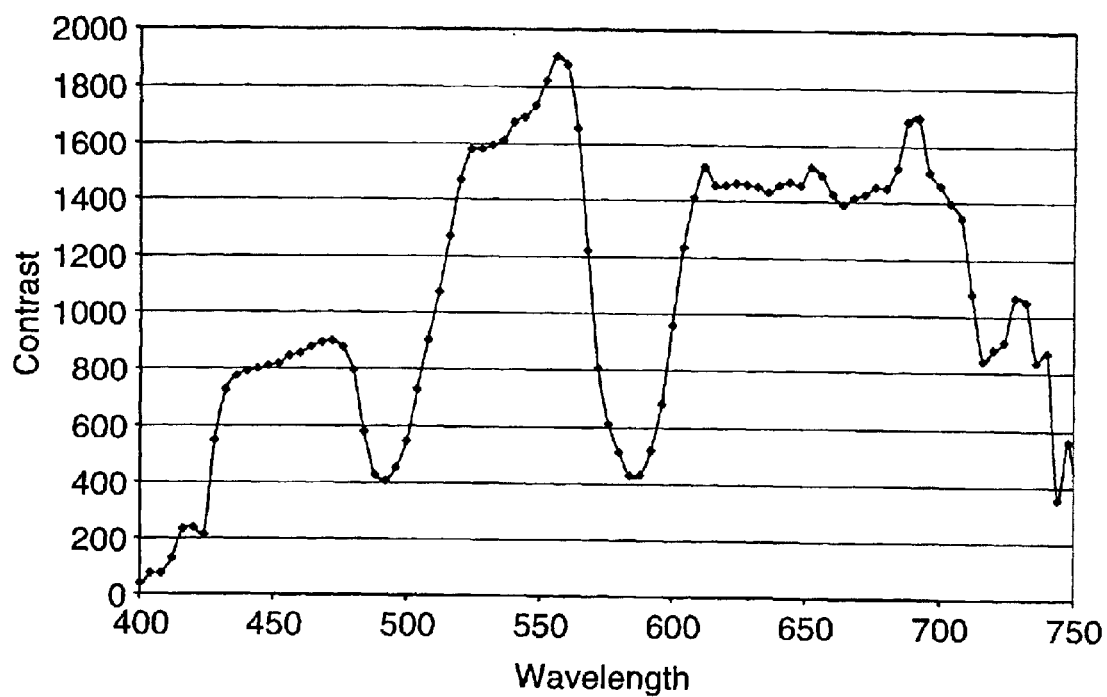
FIG. 17 presents a graph of contrast plotted against wavelength for a multilayer thin film polarizer used in an embodiment of the invention.

In addition, because the PBS's may be optimized for their respective color bands, there is very little leakage in the dark state, and so image contrast is increased. A graph showing the contrast ratio (y-axis) as a function of wavelength (x-axis) from a projection system 1600 is presented in FIG. 17. To obtain the data provided in FIG. 17, the imagers were replaced by quarter wave mirrors. A quarter wave mirror is a combination of a quarter wave retarder and an aluminum mirror. Orientation of the quarter wave retarder in one direction results in no polarization rotation of the reflected light, and so the reflected light is directed via the PBS's back to the light source. Reorientation of the quarter wave retarder results in rotation of the polarization of the reflected light so that essentially all of the reflected light is directed by the PBS to the projection lens. As can be seen, the contrast of the projected image is high, falling below 400 nowhere in the wavelength range of about 425 nm–700 nm.

Figure 18:
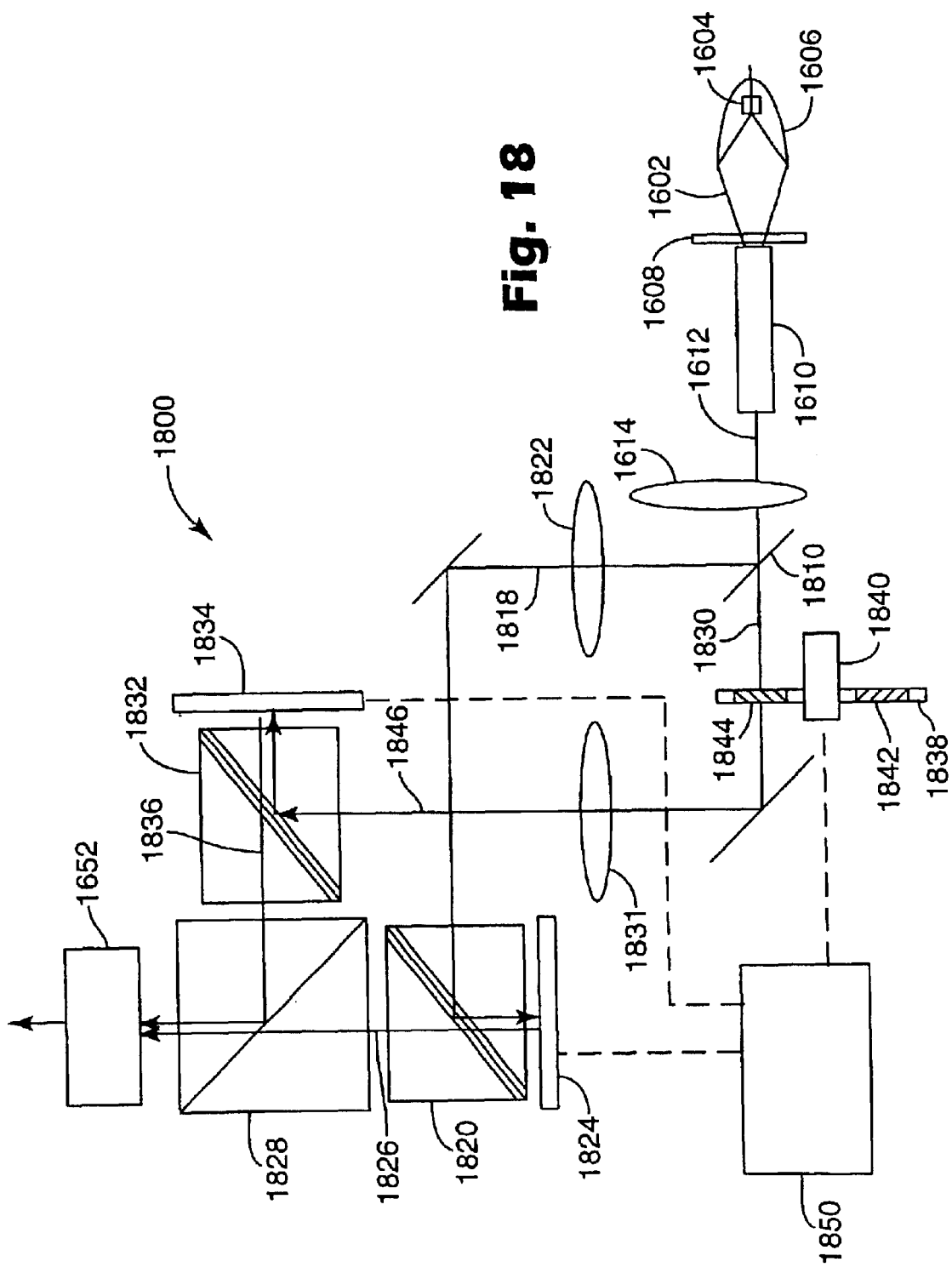
FIG. 18 schematically illustrates a two-imager projector system that uses astigmatism-reducing polarizing beamsplitters, according to an embodiment of the present invention.

Another embodiment of a projection engine 1800 is illustrated in FIG. 18. This projection engine is based on the use of two imagers. The light illumination optics may be similar to those described above with regard to the projection engine 1600, and so are marked with the same reference numbers.

The prepolarized, homogenized light 1612 is passed through a first divergence reducing lens 1614 and is incident on a first color separator 1810. The color separator 1810 may be in the form of a thin dielectric film filter. Light 1818 in a first color band is directed to a first PBS 1820. The light 1818 may be passed through another lens, 1822 or lens system. The light 1818 is directed to a first imager 1824, which imposes an image on the reflected light 1826. The image light 1826 passes through the PBS 1820 to the color combiner 1828.

Light 1830, separated from the first color band as a second color band, is directed to the second PBS 1832, which directs the light 1830 to the second imager 1834. The light 1830 may pass through one or more lenses 1831 to control its divergence. The imager 1834 imposes an image on the reflected light 1836. The image light 1836 is then color combined with the image light 1826 in the color combiner 1828. The light 1830 in the second color band may be color modulated by a color modulator 1838, for example by being passed through a color wheel which is rotated by a motor 1840. The color wheel includes transmission filters 1842 and 1844 for at least two different color sub-bands. Thus, the light 1830 may be temporally modulated to be alternatively in the first and second color sub-bands. As an illustrative example, the light 1818 in the first color band may be blue, while the light 1830 in the second color band is green and red. In such a case, the color wheel typically has alternating green and red transmission filters, so that at any one time, the color modulated light 1846 reaching the second PBS 1832 is either green or red. In another embodiment, the light 1818 in the first color band is red, while the light 1830 in the second color band is green and blue. It will be appreciated that other approaches may be used to color modulate the light 1830. For example, the color modulator 1838 may be an electro-optic method color modulator, such as is described in "High throughput Color Switch for Sequential Color Projection" by G. D. Sharp et al., SID 2000 Digest, paper 9.4, 2000.

The imagers 1824 and 1834 may be operated by a controller 1850 to display the appropriate images at the correct times. The color modulator 1838 may also be controlled by the controller 1850, so that the color of light 1846 transmitted through the color modulator is synchronized with the image being displayed by the imager 1834.

The PBS's 1820 and 1832 may provide astigmatism compensation, for example in the manner described above with reference to FIG. 11. Other approaches to astigmatism may also be used, such as that described below with reference to FIG. 15.

Figure 19:
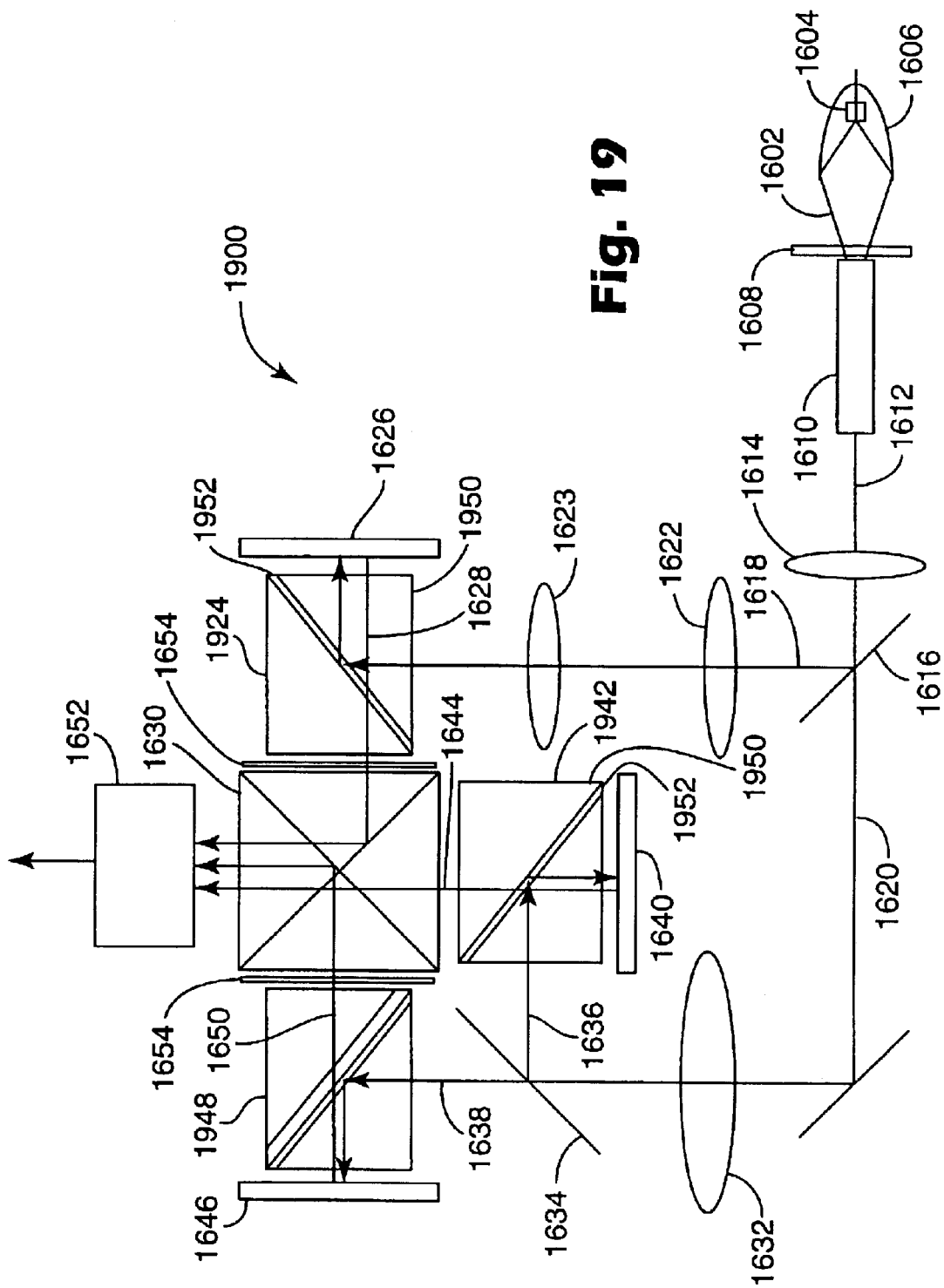
FIG. 19 schematically illustrates another projection system that uses an astigmatism-reducing polarizing beamsplitter, according to an embodiment of the present invention.

Another embodiment of a three-imager projection system 1900 is schematically illustrated in FIG. 19. Elements of the projection system 1900 that are similar to those of the projection system 1600 are labeled the same.

In this embodiment, the first and second PBS 1924 and 1942 are formed using covers 1950 of a refractive index that is close in refractive index to the multilayer polarizing films 1952. This is particularly advantageous for light in color bands that do not need to use highly blue transparent polarizing films, such as PET-based polarizing films. On the other hand, it has been found that PET films degrade less than other types of multilayer films when illuminated by blue light, and so a PET-based multilayer film is commonly used for the blue color band. The blue color band is also susceptible to thermally induced birefringence, and so it is preferred that the cover of a PBS used in the blue color band have a low modulus of photoelasticity. It is common, therefore, to use a cover of a relatively high index glass material for the blue color band in order to use a PET-based multilayer film and to reduce thermal birefringence. As a result, the PBS 1948 in the blue color band may still include astigmatism compensation.

Since the green and red color bands may use a multilayer film having a high optical power, for example a PEN-based film, glass covers of a lower refractive index may be used for these color bands, reducing the astigmatism introduced by the PBS's 1924 and 1942. For example, if the covers of the PBS's 1924 and 1942 are formed from SF12 glass, having a refractive index of n=1.62, then the astigmatism is small, around 17 μm, when the multilayer film is based on PEN. Accordingly, light in the green and red color bands may use PBS's that include no astigmatism compensation. The PBS 1948 for the blue color band may use, for example, PBH55 glass for the covers and a glass slab made from PBH71.

The optical path length between the imagers and the projection optics 1652 may be set to be approximately equal for each respective light band. This may be achieved, for example, by setting the physical separation between each imager and the color combiner 1630 to respectively different values, or by using glass covers of different thicknesses.

Figure 12:
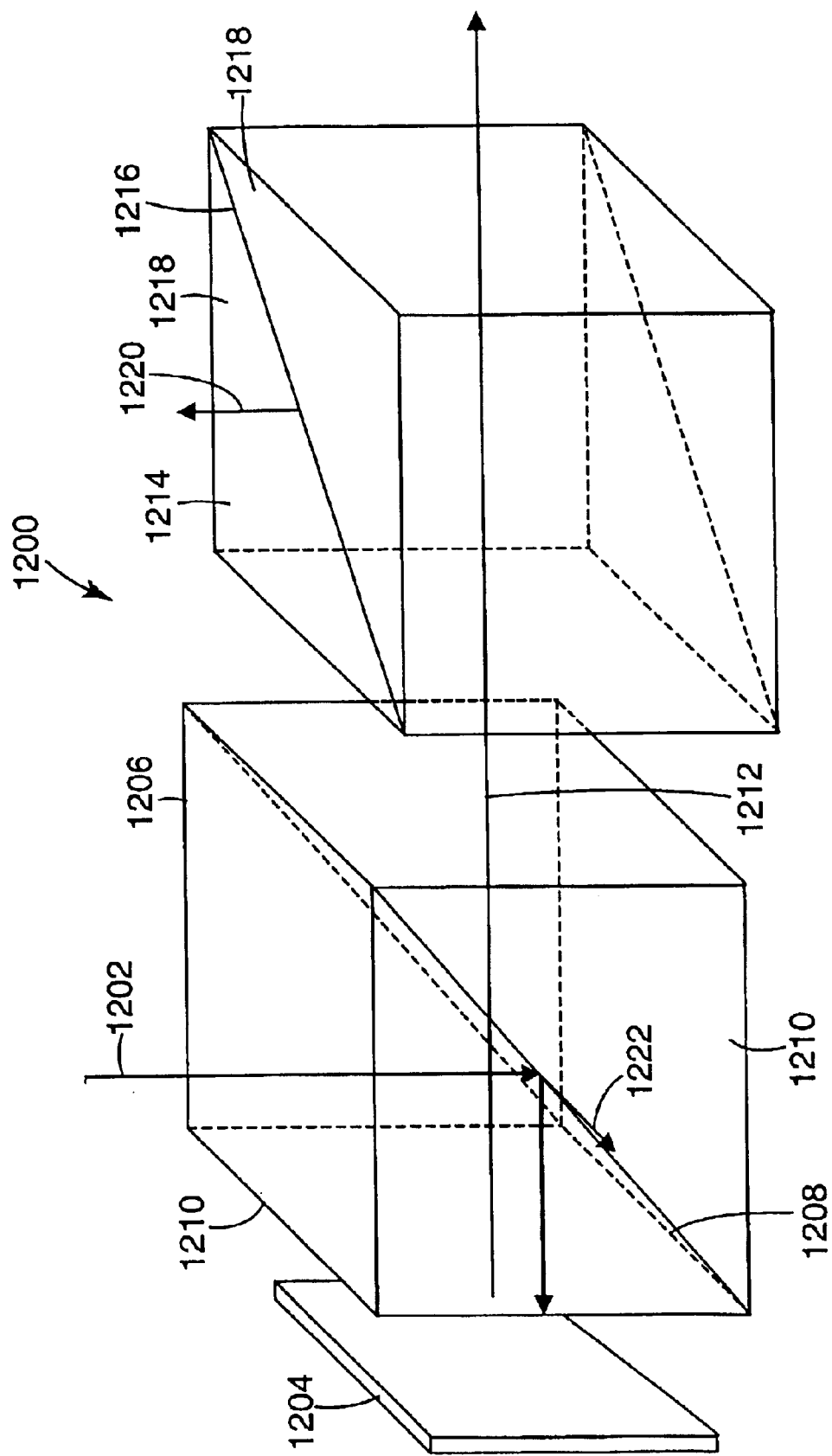
FIG. 12 schematically illustrates another embodiment of a projection engine, according to the present invention.

Another approach to compensating astigmatism in a system that uses only a single imager is illustrated in the embodiment shown in FIG. 12. Light 1202 from a light source (not shown) is reflected towards the imager 1204 by a PBS 1206 formed from an MRPB film 1208 sandwiched between glass prisms 1210. The image light 1212 reflected from the imager 1204 is transmitted through the PBS 1206. The image light 1212 is astigmatic due to the passage through the PBS 1206.

The image light 1212 is passed through an astigmatism-correcting cube 1214, having a film 1216 of relatively low refractive index sandwiched between two prisms 1218 of relatively high refractive index. The plane of the film 1216 is rotated around a rotation axis 1220 that is perpendicular to the rotation axis 1222 of the MRPB film 1208 in the PBS 1206. The thickness and angle of the film 1216 may be selected to reduce or substantially correct astigmatism arising in the PBS 1206 or in other components of the projection system.

In one embodiment, the cube 1214 may be formed from an MRPB film 1216 similar to the MRPB film 1208, sandwiched between two glass prisms 1218 similar to the glass prisms 1210 of the PBS 1206. In such a case, the MRPB film 1216 is oriented so as to transmit the image light 1212. The second MRPB film 1216 may be used as a post-polarizer, thus increasing the contrast by reducing the transmission of the light in the polarization state blocked by the PBS 1206.

The optical requirements of the first MRPB film 1208, namely high transmission of one polarization state and high reflection of the other polarization state, are high so that good contrast is obtained in the image beam 1212. This means that only the best performing sections of a manufactured length of MRPB film are suitable for use as the first MRPB film 1208. However, the optical requirements of the second MRPB film 1216 are more relaxed, since it is not the primary means of generating contrast, and is used primarily for astigmatism compensation and for clean up. The extinction ratio for transmitted light may be in the range 100:1–10:1. Therefore, the second MRPB film 1216 may be formed from less than optimally performing sections of a manufactured length of MRPB film, thus increasing the fraction of a manufactured length of MRPB film that is useful.

The cube 1214 may also be a MacNeille PBS having a thick plate. It is possible to use the MacNeille PBS in this embodiment because it is only operating in transmission, and light reflected by the MacNeille PBS, which contains mixed polarization states, is disregarded. Where a MacNeille PBS is used, the second cube may be formed from BK7 glass.

It will be appreciated that the embodiment of astigmatism correction illustrated in FIG. 12 may also be implemented in a multiple-imager imager core, where a color separator/combiner is used between the PBS 1206 and the imagers.

Figure 13:
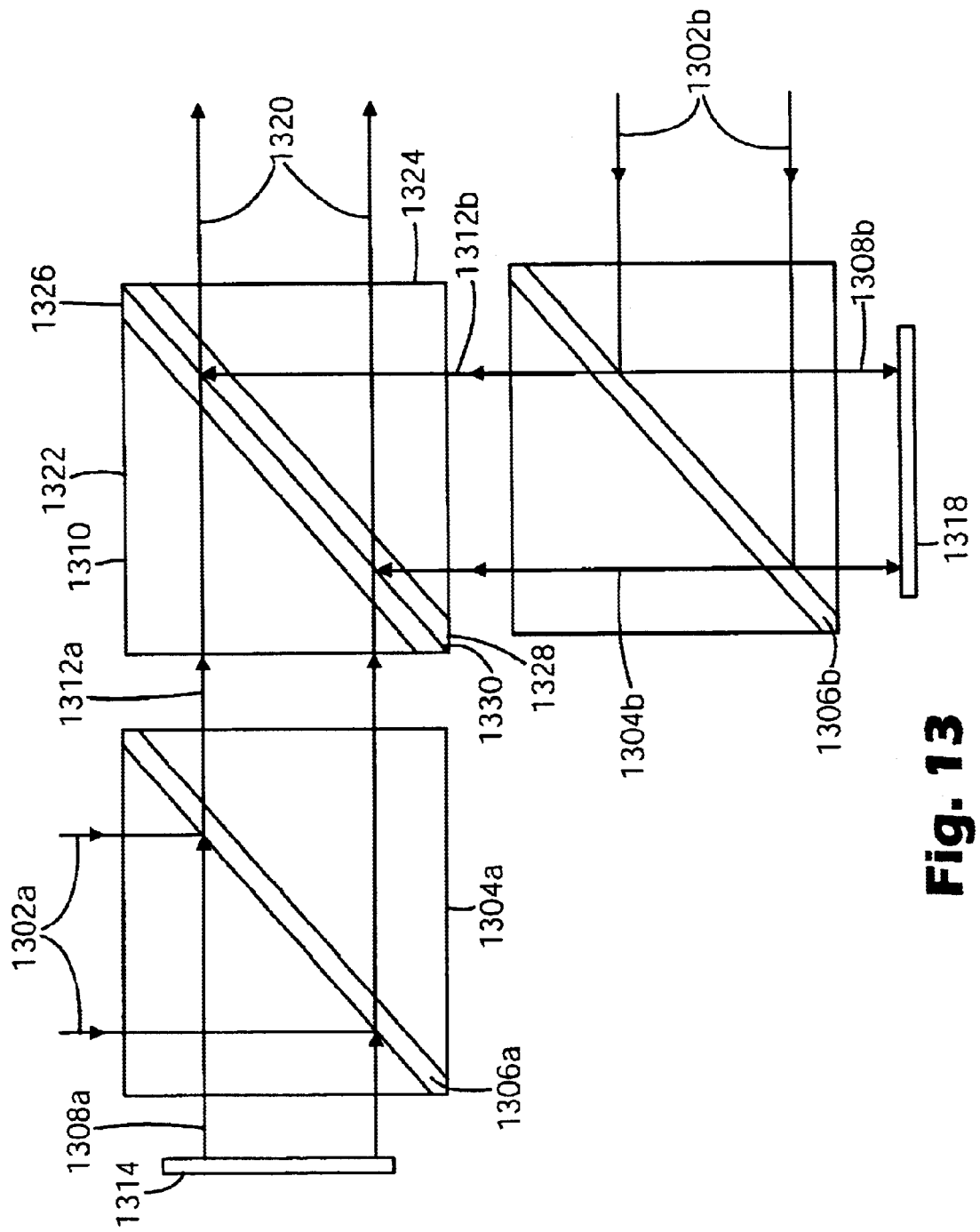
FIG. 13 schematically illustrates an embodiment of a two imager projection engine, according to the present invention.

Another particular embodiment of astigmatism correction, that is advantageous for correcting astigmatism in a projection engine 1300 based on two imagers, is schematically illustrated in FIG. 13. In this embodiment, light 1302a and 1302b, from a light source (not illustrated) is incident on respective Cartesian PBSs 1304a and 1304b. The different light beams 1302a and 1302b may be generated by separating the light from a light source using a reflective dichroic filter or by any other suitable method for producing two color bands. The PBSs 1304a and 1304b may use respective MRPB films 1306a and 1306b to reflect light in a particular polarization state. The light 1308a and 1308b reflected from the PBSs 1304a and 1304b is directed to the respective imagers 1314 and 1318. Image light 1312a reflected by the first imager 1314 is transmitted through the PBS 1304a to the dichroic combiner 1310. Image light 1312b reflected by the second imager 1318 is transmitted through the PBS 1304b to the dichroic combiner 1310. The image light 1312a, in the first color band, is transmitted through the dichroic combiner 1310 while the image light 1312b, in the second color band, is reflected by the dichroic combiner 1310 so as to combine with the first image light 1312a, and produce the combined image light output 1320.

The dichroic combiner 1310 is formed from two prisms 1322 and 1324, typically glass prisms. The prisms 1322 and 1324 are formed from material having a first refractive index. Each prism 1322 and 1324 has a respective plate 1326 and 1328 of high index material, for example high index glass, along its base. A dichroic film 1330 is disposed between the two plates 1326 and 1328 of high index material.

Figure 14:
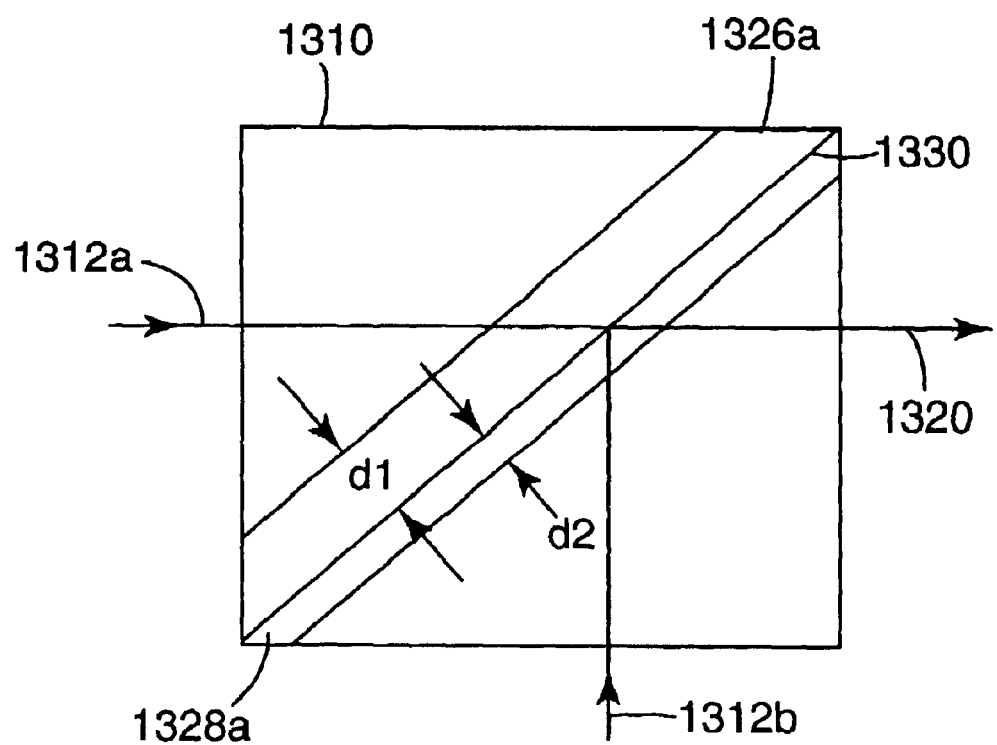
FIG. 14 schematically illustrates an embodiment of a polarizing beamsplitter, according to another embodiment of the present invention.

The plates 1326 and 1328 of high index material are selected to have thicknesses that substantially reduce astigmatism, for example the astigmatism arising in the PBSs 1304a and 1304b. The plates 1326 and 1328 may be selected to have equal thicknesses, as illustrated. The plates 1326 and 1328 may also be selected so that one plate is thicker than the other, as shown in FIG. 14. This latter embodiment may be advantageous, for example, where it is determined that one color band requires more astigmatism correction than the other color band. For example, the color band having the shorter wavelength range may be determined to require less astigmatism correction than the light in the longer wavelength band. Where the first plate 1326a has a thickness d1 and the second plate 1328a has a thickness d2, the light 1312a in the first color band passes through a combined thickness of high index material of d1+d2. On the other hand, light 1312b in the second color band passes through a combined thickness of high index material of 2×d2. Thus, where d1>d2, the image light 1312a in the first color band experiences a greater amount of astigmatism correction than the image light 1312b in the second color band.

In addition to adding slabs of high index or low index to the optical system for astigmatism reduction, astigmatism may also be reduced by introducing a wedged component into the optical system. One particular embodiment of a wedged astigmatism correction element is featured in FIG. 15, which shows a PBS 1500 formed of two glass prisms 1502 and 1504, with an MRPB film 1506 sandwiched therebetween. Light 1508 from a light source (not shown) is reflected by the MRPB film 1506 to at least one imager 1510. If more than one imager 1510 is used, a color prism 1512 may be placed between the PBS 1500 and the multiple imagers.

A wedge plate 1514 is disposed between the MRPB film 1506 and one of the prisms 1502 and 1504. The wedge plate 1514 may be formed of any suitable transparent material. For example, the wedge plate 1514 may be formed of glass or polymer. In one particular embodiment, the wedge plate 1514 is formed from optical adhesive, such as Norland 61 that adheres the MRPB film 1506 to the prism 1504.

The embodiment is illustrated further with an example. For glass prisms 1502 and 1504 formed from SF57 glass and an MRPB film/adhesive layer thickness of 225 µm, the wedge angle, α, required for astigmatism correction is between 0.15°–0.25°, calculated using a ray tracing program, ZEMAX. For a prism height of h, the wedge thickness, w, on the wide side of the wedge 1514 is given by the expression:

$$w = h \cdot \sqrt{2} \cdot \alpha \cdot \frac{\pi}{180} \qquad (2)$$

Where h=35 mm, the thickness, w, is calculated to be 129 µm, and so the optical path length change at the center of the PBS is equal to 65 µm. The wedge may be formed of optical adhesive by placing a 129 µm spacer on one side of the prism 1504 and filling the resulting wedged space with optical adhesive. The optical adhesive may then be cured using UV light.

The spacers may be glass or plastic spheres deposited along only the wide side of the wedge. Alternatively, the spacers may be structures embossed into the MRPB film 1506 or attached to the PBS prism 1504. If manufacturing tolerances are suitably high, there may be no spacer at all. A machine may automatically create the gap for the wedge to be filled with adhesive during manufacture simply by tilting one of the prisms with respect to the other.

The shape of the other prism 1502 may be adjusted to correct for non-parallelism in the PBS 1500 in the imaging path.

One of the advantages of using a wedged element 1514 to correct for astigmatism is that the total thickness of the PBS may be less than, for example, the embodiment illustrated in FIG. 11, where the addition of the high index plate increased the optical path by over 2.8 mm. Since the wedge angle is small, the wedge 1514 may be formed simply from the adhesive used to attach the MRPB film 1506 to the prisms 1502 and 1504. No extra optical components, such as slabs, are required in the wedged PBS assembly. It will be appreciated that wedge astigmatism compensation may be introduced in other components, for example in a dichroic separator/combiner or in an X-cube combiner.

Figure 15:
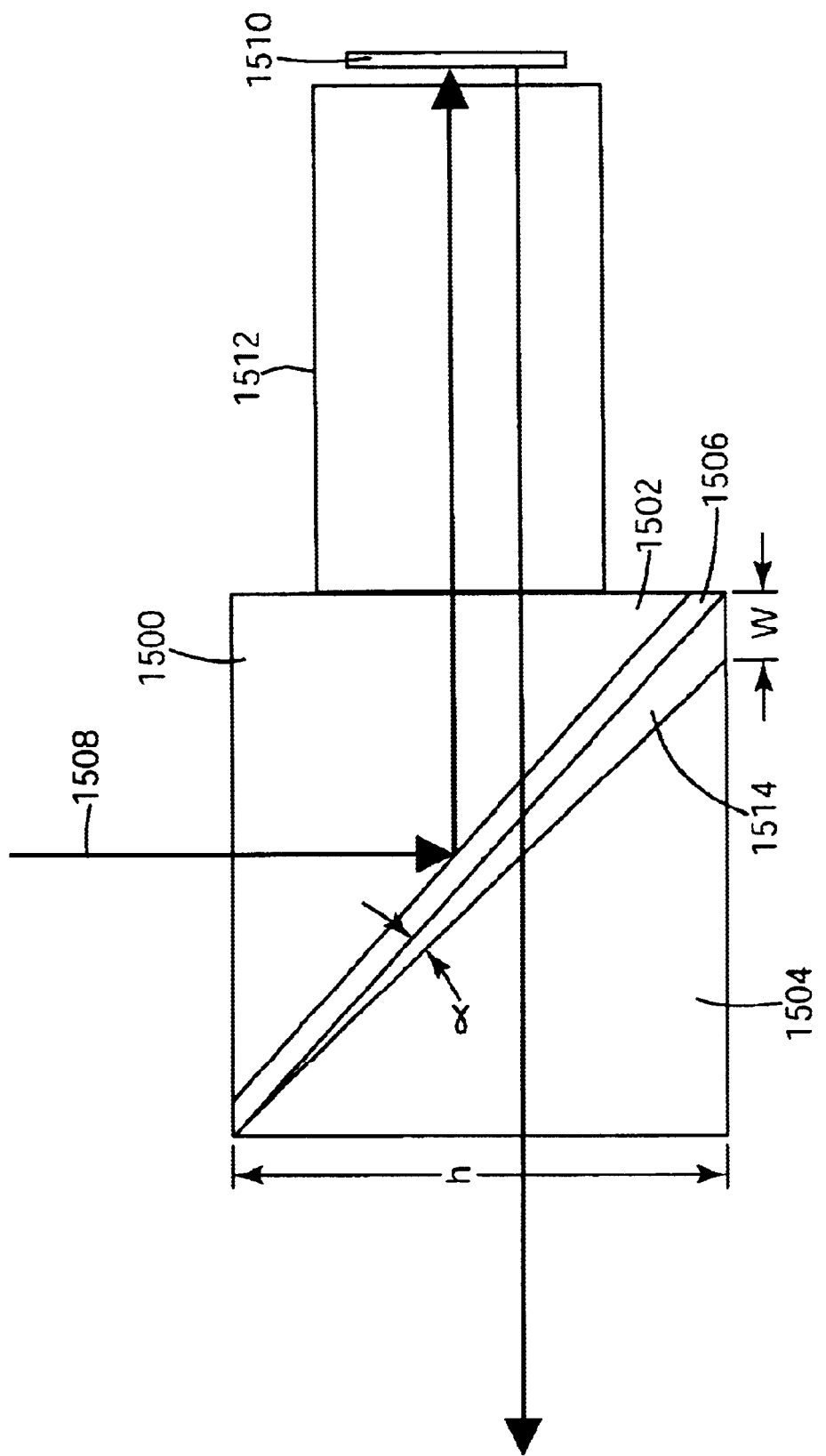
FIG. 15 schematically illustrates an embodiment of a polarizing beamsplitter that incorporates a wedged component, according to the present invention.

It will be appreciated that a single imager projection system, as illustrated in FIG. 15, may also employ different types of astigmatism-reduced PBS. For example, the PBS 1500 may be replaced by a PBS such as PBS 1100, illustrated in FIG. 11. Likewise, the astigmatism-reduced PBS 1500 may be used in multi-imager projection systems, for example the multi-imager projection systems schematically illustrated in FIGS. 16 and 18.

As noted above, the present invention is applicable to display devices, and is believed to be particularly useful in reducing astigmatism in a projection system, for example astigmatism introduced by a polarizing beamsplitter that uses a polymeric multilayer, reflective polarizing beamsplitter film. A common type of polymeric multilayer, reflective polarizing beamsplitter film is a matched index multilayer film. The invention may also be used to reduce astigmatism that arises in other components of the projection system. Furthermore, the invention is applicable to projection systems having a wide range of f-number, but is believed to be particularly useful in projection systems having a low f-number.

The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

We claim:

1. A projection system, comprising:
   a light source to generate light;
   an imaging core including at least a first reflecting imager and a first polarizing beamsplitter to impose an image on light received from the light source, the first polarizing beamsplitter being adapted to reduce astigmatism in the image light reflected from the reflecting imager; and
   a projection lens system to project the astigmatism-reduced image light from the imaging core.

2. A system as recited in claim 1, wherein the imaging core further includes a second reflecting imager and a second polarizing beamsplitter, the first and second reflective imagers and the first and second polarizing beamsplitters imposing light on respective first and second color bands.

3. A system as recited in claim 2, wherein the imaging core includes a color combiner disposed to combine the image light in the respective color bands received from the at least first and second reflective imagers.

4. A system as recited in claim 3, further comprising a polarization rotation element disposed between one of the first and second polarizing beamsplitters and the color combiner.

5. A system as recited in claim 3, further comprising a third reflective imager and a third polarizing beamsplitter, wherein the color combiner is an x-cube color combiner disposed to combine image light from the first, second and third reflective imagers.

6. A system as recited in claim 5, further comprising a polarization rotating element disposed between the color combiner and at least one of the first, second and third polarizing beamsplitters.

7. A system as recited in claim 3, further comprising color separating optical elements disposed to separate light from the light source into the respective color bands directed to the at least first and second reflective imagers.

8. A system as recited in claim 3, further comprising a temporally modulated color filter disposed in a beam of light directed to at least one of the reflective imagers so as to modulate the color of light directed to the at least one of the reflective imagers.

9. A system as recited in claim 8, wherein the temporally modulated color filter is a color wheel.

10. A system as recited in claim 9, further comprising a controller coupled to synchronize timing of the temporally modulated color wheel with image information directed to the at least one of the reflective imagers.

11. A system as recited in claim 8, wherein the temporally modulated color filter is an electro-optic color switch.

12. A system as recited in claim 11, further comprising a controller coupled to synchronize timing of the temporally modulated electro-optic color switch with image information directed to the at least one of the reflective imagers.

13. A system as recited in claim 1, wherein astigmatism in the image light is reduced to a value less than a depth of field of the projection lens system.

14. A system as recited in claim 1, further comprising light conditioning optics disposed between the light source and the imaging core.

15. A system as recited in claim 1, further comprising a controller coupled to the at least a first reflecting imager to control the image imposed on light incident on the at least a first reflecting imager.

16. A system as recited in claim 1, wherein the first polarizing beamsplitter is a Cartesian polarizing beamsplitter.

17. A system as recited in claim 1, further comprising light conditioning optics disposed between the light source and the imaging core having an f-number equal to or less than 2.5.

18. A system as recited in claim 17, wherein the projection lens system has an f-number matched to the f-number of the conditioning optics.

19. A system as recited in claim 1, wherein the imaging core is designed for telecentric illumination and projection.

20. A system as recited in claim 1, wherein the first polarizing beamsplitter includes a polarization sensitive, reflective multilayer film having refractive indices in a first refractive index range, and covers on either side of the polarization sensitive, reflective multilayer film having a second refractive index higher than the first refractive index range, a sheet of material lying between the multilayer film and one of the covers having a third refractive index higher than the second refractive index.

21. A system as recited in claim 1, wherein the first polarizing beamsplitter includes a multilayer, polarization sensitive reflective film disposed between first and second covers, a wedge of a wedge material being disposed between multilayer film and one of the covers, the wedge material having a refractive index less than the refractive index of the covers.

22. A system as recited in claim 1, wherein the light from the light source is reflected in the first polarizing beamsplitter and the image light reflected from the imager is transmitted through the first polarizing beam splitter.

23. A projection system, comprising:
    light generating means for generating light;
    imaging core means for imposing an image on light received from the light generating means, the imaging core means including at least first imager means and first polarization beamsplitting means for polarization mode beamsplitting, at least one of the beamsplitting means being adapted to reduce astigmatism in the image light; and
    a projection lens unit to project the astigmatism-reduced image light from the imaging core means.

24. A polarizing beamsplitter, comprising:
    a multilayer, polarization sensitive film disposed between covers and an astigmatism reducing element disposed between opposing outside faces of the covers to reduce astigmatism introduced by the polarizing film.

25. A beamsplitter as recited in claim 24, wherein multilayer, polarization sensitive film is a multilayer polymer, polarization sensitive film.

26. A beamsplitter as recited in claim 24, wherein the astigmatism reducing element is disposed between the covers.

27. A beamsplitter as recited in claim 24, wherein the covers are formed of a material having a refractive index higher than the refractive index of the multilayer film.

28. A polarizing beamsplitter as recited in claim 24, wherein the astigmatism compensating element is a plate of material disposed between the covers and having a refractive index higher than the refractive index of the first and second covers.

29. A polarizing beamsplitter as recited in claim 24, wherein the astigmatism compensating element is a wedge of material having a refractive index less than the refractive index of the first and second covers.

30. A polarizing beamsplitter as recited in claim 24, wherein the covers are glass prisms.

31. A polarizing beamsplitter as recited in claim 24, wherein the multilayer polarization sensitive film is optimized for polarization sensitivity in one of a red, green or blue projection color band.

32. A projection system, comprising:

a light source to generate light;

an imaging core including at least a first reflecting imager and a first polarizing beamsplitter to impose an image on light received from the light source, the first polarizing beamsplitter including a multilayer polarizing film disposed between covers and an astigmatism reducing element to reduce astigmatism introduced by the polarizing film; and a projection lens system to project image light received from the imaging core.

33. A system as recited in claim 32, wherein the imaging core further includes a second reflecting imager and a second polarizing beamsplitter, the first and second reflective imagers and the first and second polarizing beamsplitters imposing light on respective first and second color bands.

34. A system as recited in claim 33, wherein the imaging core includes a color combiner disposed to combine the image light in the respective color bands received from the at least first and second reflective imagers.

35. A system as recited in claim 34, further comprising a polarization rotation element disposed between one of the first and second polarizing beamsplitters and the color combiner.

36. A system as recited in claim 34, further comprising a third reflective imager and a third polarizing beamsplitter, wherein the color combiner is an x-cube color combiner disposed to combine image light from the first, second and third reflective imagers.

37. A system as recited in claim 36, further comprising a polarization rotating element disposed between the color combiner and at least one of the first, second and third polarizing beamsplitters.

38. A system as recited in claim 34, further comprising color separating optical elements disposed to separate light from the light source into the respective color bands directed to the at least first and second reflective imagers.

39. A system as recited in claim 34, further comprising a temporally modulated color filter disposed in a beam of light directed to at least one of the reflective imagers so as to modulate the color of light directed to the at least one of the reflective imagers.

40. A system as recited in claim 32, wherein astigmatism in the image light is reduced to a value less than a depth of field of the projection lens system.

41. A system as recited in claim 32, further comprising light conditioning optics disposed between the light source and the imaging core.

42. A system as recited in claim 32, further comprising a controller coupled to the at least a first reflecting imager to control the image imposed on light incident on the at least a first reflecting imager.

43. A system as recited in claim 32, wherein the first polarizing beamsplitter is a Cartesian polarizing beamsplitter.

44. A system as recited in claim 32, further comprising light conditioning optics disposed between the light source and the imaging core having an f-number of no more than 2.5.

45. A system as recited in claim 32, wherein the imaging core is designed for telecentric illumination and projection.

46. A system as recited in claim 32, wherein the multilayer film has refractive indices in a first refractive index range, and the covers have a second refractive index higher than the first refractive index range, the astigmatism reducing element including a sheet of material lying between the multilayer film and one of the covers having a third refractive index higher than the second refractive index.

47. A system as recited in claim 32, wherein the astigmatism reducing element includes a wedge of a wedge material being disposed between multilayer film and one of the covers, the wedge material having a refractive index less than the refractive index of the covers.

48. A system as recited in claim 32, wherein the multilayer, polarization sensitive film is a multilayer polymer, polarization sensitive film.

* * * * *

UNITED STATES PATENT AND TRADEMARK OFFICE
CERTIFICATE OF CORRECTION

PATENT NO. : 6,786,604 B2
DATED : September 7, 2004
INVENTOR(S) : Aastuen, David J. W.

It is certified that error appears in the above-identified patent and that said Letters Patent is hereby corrected as shown below:

Column 7,
Line 20, delete "n'is" and insert -- n' is --, therefore.

Column 14,
Line 24, delete "no" and insert -- $n_0$ --, therefor.
Line 27, delete "$n_2>_{n0}>n_1$" and insert -- $n_2 > n_0 > n_1$ --, therefore.

Column 22,
Line 35, delete "beam splitter" and insert -- beamsplitter --, therefore.

Signed and Sealed this

Eleventh Day of January, 2005

JON W. DUDAS
*Director of the United States Patent and Trademark Office*